United States Patent
Baird, III

(10) Patent No.: US 11,475,150 B2
(45) Date of Patent: Oct. 18, 2022

(54) METHODS AND APPARATUS FOR IMPLEMENTING STATE PROOFS AND LEDGER IDENTIFIERS IN A DISTRIBUTED DATABASE

(71) Applicant: Hedera Hashgraph, LLC, Richardson, TX (US)

(72) Inventor: Leemon C. Baird, III, Richardson, TX (US)

(73) Assignee: Hedera Hashgraph, LLC, Richardson, TX (US)

(*) Notice: Subject to any disclaimer, the term of this patent is extended or adjusted under 35 U.S.C. 154(b) by 335 days.

(21) Appl. No.: 16/881,132

(22) Filed: May 22, 2020

(65) Prior Publication Data

US 2020/0372015 A1 Nov. 26, 2020

Related U.S. Application Data

(60) Provisional application No. 62/851,368, filed on May 22, 2019.

(51) Int. Cl.
*G06F 21/62* (2013.01)
*G06F 16/23* (2019.01)
(Continued)

(52) U.S. Cl.
CPC ...... *G06F 21/6218* (2013.01); *G06F 16/2365* (2019.01); *G06F 16/2379* (2019.01);
(Continued)

(58) Field of Classification Search
None
See application file for complete search history.

(56) References Cited

U.S. PATENT DOCUMENTS

| 4,309,569 A | 1/1982 | Merkle |
| 5,701,480 A | 12/1997 | Raz |

(Continued)

FOREIGN PATENT DOCUMENTS

| CA | 2845306 A1 | 2/2013 |
| CN | 102567453 A | 7/2012 |

(Continued)

OTHER PUBLICATIONS

Anonymous: "SAMMANTICS," Oct. 30, 2016 (Oct. 30, 2016), pp. 1-169, Retrieved from the Internet: URL:https://web.archive.org/web/20161030182822/https://web.archive.org/web/2016103018 [retrieved on Apr. 11, 2020].

(Continued)

*Primary Examiner* — Bradley W Holder
(74) *Attorney, Agent, or Firm* — Cooley LLP

(57) ABSTRACT

A method includes calculating, at a first time, an identifier for a distributed database by using a first address book of the distributed database. The method includes receiving a transaction to at least one of (1) add a compute device to the first set of compute devices, (2) remove a compute device from the first set of compute devices, or (3) modify a compute device from the first set of compute devices, to define a second set of compute devices. The method includes defining, at a second time, a second address book. The method includes receiving, a state proof associated with data of the distributed database after the second time. The method includes verifying the data of the distributed database by confirming that a predetermined number of compute devices from the first set of compute devices have digitally signed the second address book.

29 Claims, 7 Drawing Sheets

(51) Int. Cl.
*G06F 16/27* (2019.01)
*H04L 9/14* (2006.01)
*H04L 9/32* (2006.01)
*H04L 9/30* (2006.01)

(52) U.S. Cl.
CPC ............... *G06F 16/27* (2019.01); *H04L 9/14* (2013.01); *H04L 9/30* (2013.01); *H04L 9/3247* (2013.01)

(56) References Cited

U.S. PATENT DOCUMENTS

| | | |
|---|---|---|
| 5,991,414 A | 11/1999 | Garay et al. |
| 6,446,092 B1 | 9/2002 | Sutter |
| 6,457,007 B1 | 9/2002 | Kikuchi et al. |
| 6,584,476 B1 | 6/2003 | Chatterjee et al. |
| 6,594,328 B1 | 7/2003 | Chen et al. |
| 6,966,836 B1 | 11/2005 | Rush et al. |
| 7,062,490 B2 | 6/2006 | Adya et al. |
| 7,240,060 B2 | 7/2007 | Adya et al. |
| 7,555,516 B2 | 6/2009 | Lamport |
| 7,558,883 B1 | 7/2009 | Lamport |
| 7,590,632 B1 | 9/2009 | Caronni et al. |
| 7,797,457 B2 | 9/2010 | Lamport |
| 7,844,745 B1 | 11/2010 | Darbyshire et al. |
| 7,849,223 B2 | 12/2010 | Malkhi et al. |
| 7,890,508 B2 | 2/2011 | Gerber et al. |
| 8,037,279 B2 | 10/2011 | Schuba et al. |
| 8,112,452 B2 | 2/2012 | Adya et al. |
| 8,285,689 B2 | 10/2012 | Du et al. |
| 8,423,678 B2 | 4/2013 | Darbyshire et al. |
| 8,478,114 B1 | 7/2013 | Beach et al. |
| 8,533,169 B1 | 9/2013 | Bailey et al. |
| 8,533,582 B2 | 9/2013 | Rao et al. |
| 8,571,519 B2 | 10/2013 | Ginzboorg |
| 8,600,944 B2 | 12/2013 | Bryant et al. |
| 8,612,386 B2 | 12/2013 | Tien et al. |
| 8,654,650 B1 | 2/2014 | Vermeulen et al. |
| 8,713,038 B2 | 4/2014 | Cohen et al. |
| 8,732,140 B2 | 5/2014 | Bird et al. |
| 8,766,980 B2 | 7/2014 | Miyashita et al. |
| 8,775,464 B2 | 7/2014 | Bulkowski et al. |
| 8,799,248 B2 | 8/2014 | Bulkowski et al. |
| 8,862,617 B2 | 10/2014 | Kesselman |
| 8,868,467 B2 | 10/2014 | Serebrennikov |
| 8,880,486 B2 | 11/2014 | Driesen et al. |
| 8,886,601 B1 | 11/2014 | Landau et al. |
| 8,914,333 B2 | 12/2014 | Bird et al. |
| 9,189,342 B1 | 11/2015 | Von Thenen et al. |
| 9,244,717 B2 | 1/2016 | Pissay et al. |
| 9,251,235 B1 | 2/2016 | Hurst et al. |
| 9,280,591 B1 | 3/2016 | Kharatishvili et al. |
| 9,390,154 B1 | 7/2016 | Baird, III |
| 9,407,516 B2 | 8/2016 | Gordon |
| 9,529,923 B1 | 12/2016 | Baird, III |
| 9,568,943 B1 | 2/2017 | Carman |
| 9,646,029 B1 | 5/2017 | Baird, III |
| 9,842,031 B1 | 12/2017 | Kharatishvili |
| 10,097,356 B2 | 10/2018 | Zinder |
| 10,318,505 B2 | 6/2019 | Baird, III |
| 10,354,325 B1 | 7/2019 | Skala et al. |
| 10,375,037 B2 | 8/2019 | Baird, III et al. |
| 10,489,385 B2 | 11/2019 | Baird, III et al. |
| 10,572,455 B2 | 2/2020 | Baird, III |
| 10,747,753 B2 | 8/2020 | Baird, III |
| 10,887,096 B2 | 1/2021 | Baird, III |
| 11,222,006 B2 | 1/2022 | Baird, III |
| 11,232,081 B2 | 1/2022 | Baird, III |
| 11,256,832 B2 | 2/2022 | Rorato et al. |
| 2001/0025351 A1 | 9/2001 | Kursawe et al. |
| 2002/0129087 A1 | 9/2002 | Cachin et al. |
| 2002/0143800 A1 | 10/2002 | Lindberg et al. |
| 2002/0186848 A1 | 12/2002 | Shaik |
| 2003/0147536 A1 | 8/2003 | Andivahis et al. |
| 2004/0012630 A1 | 1/2004 | Carels et al. |
| 2004/0172421 A1 | 9/2004 | Saito et al. |
| 2005/0038831 A1 | 2/2005 | Souder et al. |
| 2005/0102268 A1 | 5/2005 | Adya et al. |
| 2005/0114666 A1 | 5/2005 | Sudia |
| 2006/0047720 A1 | 3/2006 | Kulkarni et al. |
| 2006/0136369 A1 | 6/2006 | Douceur et al. |
| 2006/0168011 A1 | 7/2006 | Lamport |
| 2007/0050415 A1 | 3/2007 | Amangau et al. |
| 2007/0165865 A1 | 7/2007 | Talvitie |
| 2008/0220873 A1 | 9/2008 | Lee et al. |
| 2008/0256078 A1 | 10/2008 | Bhashyam |
| 2008/0298579 A1 | 12/2008 | Abu-Amara |
| 2009/0150566 A1 | 6/2009 | Malkhi et al. |
| 2009/0158413 A1* | 6/2009 | Gentry ............... G06Q 20/367 726/9 |
| 2009/0248624 A1 | 10/2009 | Lammel et al. |
| 2010/0172504 A1 | 7/2010 | Allen et al. |
| 2010/0198914 A1 | 8/2010 | Gehrke et al. |
| 2010/0257198 A1 | 10/2010 | Cohen et al. |
| 2011/0029689 A1 | 2/2011 | Darbyshire et al. |
| 2011/0173455 A1 | 7/2011 | Spalka et al. |
| 2011/0191251 A1 | 8/2011 | Al-Herz et al. |
| 2011/0196834 A1 | 8/2011 | Kesselman |
| 2011/0196873 A1 | 8/2011 | Kesselman |
| 2011/0250974 A1 | 10/2011 | Shuster |
| 2012/0078847 A1 | 3/2012 | Bryant et al. |
| 2012/0131093 A1 | 5/2012 | Hamano et al. |
| 2012/0150802 A1 | 6/2012 | Popov et al. |
| 2012/0150844 A1 | 6/2012 | Lindahl et al. |
| 2012/0198450 A1 | 8/2012 | Yang et al. |
| 2012/0209822 A1* | 8/2012 | Prabhakar ............ G06F 16/2365 707/703 |
| 2012/0233134 A1 | 9/2012 | Barton et al. |
| 2012/0278293 A1 | 11/2012 | Bulkowski et al. |
| 2012/0303631 A1 | 11/2012 | Bird et al. |
| 2013/0110767 A1 | 5/2013 | Tatemura et al. |
| 2013/0145426 A1 | 6/2013 | Wright et al. |
| 2013/0263119 A1 | 10/2013 | Pissay et al. |
| 2013/0290249 A1 | 10/2013 | Merriman et al. |
| 2013/0311422 A1 | 11/2013 | Walker et al. |
| 2014/0012812 A1 | 1/2014 | Zunger |
| 2014/0025443 A1 | 1/2014 | Onischuk |
| 2014/0108415 A1 | 4/2014 | Bulkowski et al. |
| 2014/0222829 A1 | 8/2014 | Bird et al. |
| 2014/0310243 A1 | 10/2014 | McGee et al. |
| 2014/0324905 A1 | 10/2014 | Matsumoto |
| 2015/0067002 A1 | 3/2015 | Shvachko et al. |
| 2015/0067819 A1 | 3/2015 | Shribman et al. |
| 2015/0074050 A1 | 3/2015 | Landau et al. |
| 2015/0172412 A1 | 6/2015 | Escriva et al. |
| 2015/0200774 A1 | 7/2015 | Le Saint |
| 2015/0242478 A1 | 8/2015 | Cantwell et al. |
| 2015/0281344 A1 | 10/2015 | Grootwassink et al. |
| 2015/0294308 A1 | 10/2015 | Pauker et al. |
| 2016/0085772 A1 | 3/2016 | Vermeulen et al. |
| 2016/0088424 A1 | 3/2016 | Polo et al. |
| 2016/0091988 A1 | 3/2016 | Letourneau |
| 2016/0140548 A1 | 5/2016 | Ahn |
| 2016/0205218 A1 | 7/2016 | Tan et al. |
| 2016/0218875 A1 | 7/2016 | Le Saint et al. |
| 2016/0241392 A1 | 8/2016 | Vandervort |
| 2016/0283920 A1 | 9/2016 | Fisher et al. |
| 2016/0292213 A1 | 10/2016 | Stanfill |
| 2016/0342976 A1 | 11/2016 | Davis |
| 2017/0006097 A1 | 1/2017 | Johnson |
| 2017/0048261 A1 | 2/2017 | Gmach et al. |
| 2017/0075938 A1 | 3/2017 | Black et al. |
| 2017/0116095 A1 | 4/2017 | Schatz et al. |
| 2017/0132257 A1 | 5/2017 | Baird, III |
| 2017/0180367 A1 | 6/2017 | Warren |
| 2017/0300550 A1 | 10/2017 | Emberson et al. |
| 2017/0308548 A1 | 10/2017 | Baird, III |
| 2018/0005186 A1 | 1/2018 | Hunn |
| 2018/0006820 A1* | 1/2018 | Arasu ............... G06F 21/645 |
| 2018/0018370 A1 | 1/2018 | Feiks et al. |
| 2018/0026782 A1 | 1/2018 | Xiao et al. |
| 2018/0101777 A1 | 4/2018 | Benja-Athon |
| 2018/0173747 A1 | 6/2018 | Baird, III |
| 2019/0020629 A1 | 1/2019 | Baird, III et al. |

(56) References Cited

U.S. PATENT DOCUMENTS

| | | | |
|---|---|---|---|
| 2019/0034517 A1 | 1/2019 | Byrd | |
| 2019/0042619 A1 | 2/2019 | Baird, III | |
| 2019/0129893 A1 | 5/2019 | Baird, III et al. | |
| 2019/0235946 A1 | 8/2019 | Guo et al. | |
| 2019/0268147 A1 | 8/2019 | Baird, III | |
| 2019/0286623 A1 | 9/2019 | Baird, III | |
| 2020/0012676 A1 | 1/2020 | Singh Narang et al. | |
| 2020/0073758 A1* | 3/2020 | Natarajan | G06F 11/1474 |
| 2020/0097459 A1 | 3/2020 | Baird, III et al. | |
| 2020/0125538 A1 | 4/2020 | Baird, III | |
| 2020/0145387 A1 | 5/2020 | Baird, III et al. | |
| 2020/0320064 A1 | 10/2020 | Baird, III | |
| 2021/0126780 A1 | 4/2021 | Baird, III | |
| 2021/0209885 A1 | 7/2021 | Lundin et al. | |
| 2022/0107960 A1 | 4/2022 | Baird, III | |
| 2022/0129438 A1 | 4/2022 | Baird, III | |

FOREIGN PATENT DOCUMENTS

| | | |
|---|---|---|
| CN | 102819585 A | 12/2012 |
| CN | 106789095 A | 5/2017 |
| JP | H09-509268 A | 9/1997 |
| JP | 2003-202964 | 7/2003 |
| JP | 2005216167 A | 8/2005 |
| JP | 2010033227 A | 2/2010 |
| JP | 2010-225148 A | 10/2010 |
| JP | 2012-027685 A | 2/2012 |
| JP | 5211342 B | 6/2013 |
| JP | 2014506345 A | 3/2014 |
| JP | 2016096547 A | 5/2016 |
| JP | 2016519379 A | 6/2016 |
| JP | 2017510002 A | 4/2017 |
| RU | 2376635 C2 | 12/2009 |
| RU | 2417426 C2 | 4/2011 |
| RU | 2449358 C1 | 4/2012 |
| RU | 2510623 | 4/2014 |
| RU | 2560810 C2 | 8/2015 |
| RU | 2595493 C2 | 8/2016 |
| WO | WO 95/14279 A1 | 5/1995 |
| WO | WO 2014/037901 | 3/2014 |
| WO | WO 2015/008377 A1 | 1/2015 |
| WO | WO-2015094329 A1 | 6/2015 |
| WO | WO-2017176523 A1 | 10/2017 |

OTHER PUBLICATIONS

Baird et al., "Hedera: A Public Hashgraph Network and Governing Council," WhitePaper V 2.0, Aug. 29, 2019, available from http://tokeninsight.com/api/upload/content/whitepaper/HBAR_en.pdf (Year: 2019), 97 pages.

International Preliminary Report on Patentability issued by the International Searching Authority for Application No. PCT/US2020/034197, dated Nov. 16, 2021, 7 pages.

Kshemkalyani., et al., "Consensus and agreement algorithms," Distributed computing: principles, algorithms, and systems. Cambridge University Press, pp. 510-531 (2011).

Shirriff, Ken: "Bitcoins the hard way: Using the raw Bitcoin protocol", Oct. 14, 2016 (Oct. 14, 2016), pp. 1-31, Retrieved from the Internet: URL:https://web.archive.org/web/20161014002912/https://web.archive.org/web/2016101400 s-hard-way-using-raw-bitcoin.html [retrieved on Apr. 12, 2022].

Tang et al., "Improved Hybrid Consensus Scheme with Privacy-Preserving Property," IACR, International Association for Cryptologic Research 2010407:004100, pp. 1-8 (2017).

Non-Final Office Action issued by The United States Patent and Trademark Office for U.S. Appl. No. 15/846,402, dated Aug. 24, 2020, 17 pages.

Office Action issued by the Russian Patent Office for Application No. 2019115233, dated Sep. 24, 2020, 13 pages including English translation.

Office Action issued by the Russian Patent Office for Application No. 2020113415, dated Oct. 5, 2020, 11 pages including English translation.

Examination Report No. 1 issued by the Australian Patent Office for Application No. 2020201827, dated Oct. 13, 2020, 4 pages.

Office Action issued by the Japanese Patent Office for Application No. 2020-065934, dated Oct. 13, 2020, 5 pages including English translation.

Office Action issued by the Canadian Patent office for Application No. 3,027,398, dated Nov. 12, 2020, 5 pages.

Office Action issued by the Chinese Patent Office for Application No. 201880069335.5, dated Nov. 4, 2011, 11 pages including English translation.

Office Action issued by the Indian Patent Office for Application No. 201817007410, dated Nov. 23, 2020, 8 pages.

Non-Final Office Action issued by The United States Patent and Trademark Office for U.S. Appl. No. 16/430,646, dated Dec. 2, 2020, 10 pages.

Tseng, et al., Exact Byzantine Consensus in Directed Graphs. ArXiv, abs/1208.5075. A1, dated Feb. 19, 2014, 33 pages.

Vaidya et al., "Iterative approximate Byzantine consensus in arbitrary directed graphs," In Proceedings of the 2012 ACM symposium on Principles of distributed computing, pp. 365-374 (2012).

Office Action issued by the Korean Patent Office for Application No. 10-2019-7021248, dated Nov. 18, 2020, 10 pages (including English translation).

Office Action issued by the Russian Patent Office for Application No. 2019118333, dated Oct. 2, 2020, 18 pages including English translation.

Extended European Search Report issued by the European Patent Office or Application No. 18874680.4, dated Dec. 23, 2020, 9 pages.

https://web.archive.org/web/20150811233709/https://en.wikipedia.org/wiki/Paxos_(computer_science). Jun. 17, 2015, 15 pages.

Knutsson et al., "Peer-to-Peer Support for Massively Multiplayer Games", Department of Computer and Information Science, University of Pennsylvania, IEEE INFOCOM 2004.

GauthierDickey, Chris, et al. "Low latency and cheat-proof event ordering for peer-to-peer games." Proceedings of the $14^{th}$ international workshop on Network and operating systems support for digital audio and video. ACM, 2004.

GauthierDickey, Chris, Virginia Lo, and Daniel Zappala. "Using n-trees for scalable event ordering in peer-to-peer games." Proceedings of the international workshop on Network and operating systems support for digital audio and video. ACM, 2005.

Lumezanu, Cristian, Neil Spring, and Bobby Bhattacharjee. "Decentralized message ordering for publish/subscribe systems." Proceedings of the ACM/IFIP/USENIX 2006 International Conference on Middleware. Springer-Verlag New York, Inc., 2006.

Moser, Louise E., and Peter M. Melliar-Smith, "Byzantine-resistant total ordering algorithms." Information and Computation 150.1 (1999): 75-111.

Défago, Xavier, et al., "Total Order broadcast and multicast algorithms: Taxonomy and survey." ACM Computing Surveys (CSUR) 36.4 (2004): 372-421.

U.S. Office Action dated Sep. 20, 2016 for U.S. Appl. No. 15/153,011, 18 pages.

Moser, Louise E., and Peter M. Melliar-Smith, "Total Ordering Algorithms for Asynchronous Byzantine Systems," International Workshop on Distributed Algorithms, 1995.

International Search Report and Written Opinion dated Jan. 5, 2017 for International Application No. PCT/US2016/049067, 16 pages.

U.S. Office Action dated May 30, 2017 for U.S. Appl. No. 15/205,688, 9 pages.

U.S. Office Action dated Oct. 26, 2017 for U.S. Appl. No. 15/205,688, 12 pages.

Lamport, Leslie, Robert Shostak, and Marshall Pease. "The Byzantine generals problem." ACM Transactions on Programming Languages and Systems (TOPLAS) 4(3): 382-401 (1982).

Wikipedia, Copy-on-write, Jul. 31, 2015, accessed Oct. 20, 2017 at https://en.wikipedia.org/w/index.php?title=Copy-on- write&oldid=673938951, 3 pages.

International Search Report and Written Opinion dated Feb. 1, 2018 for International Application No. PCT/US17/61135, 14 pages.

International Search Report and Written Opinion dated Mar. 8, 2018 for International Application No. PCT/US1767329, 13 pages.

(56) References Cited

OTHER PUBLICATIONS

First Office Action issued by the Australian Patent Office for Patent Application No. 2016316777, dated Mar. 29, 2018, 5 pages.
Office Action issued by the Canadian Patent Office for Application No. 2,996,714, dated Apr. 11, 2018, 7 pages.
Non-Final Office Action issued by The United States Patent and Trademark Office for U.S. Appl. No. 15/205,688, dated Apr. 13, 2018, 9 pages.
Extended European Search Report issued by the European Patent Office for Application No. 16842700.3, dated May 14, 2018, 15 pages.
Reed, "Bitcoin Cooperative Proof-of-Stake," May 21, 2014 (May 21, 2014, Retrieved from the Internet: URL:https://arxiv.org/ftp/arxiv/papers/1405/1405.5741.pdf [retrieved on May 2, 2018], 16 pages.
Nakamoto: "Bitcoin: A Peer-to-Peer Electronic Cash System," Jan. 13, 2009 (Jan. 13, 2009), Retrieved from the Internet: URL:https://web.archive.org/web/20090131115053/http://www.bitcoin.org/bitcoin.pdf [retrieved on Jun. 30, 2017], 9 pages.
Kwon, J., "Tendermint: Consensus without Mining," Mar. 19, 2015, Retrieved from the Internet: URL:https://web.archive.org/web/20150319035333if/http://tendermint.com:80/docs/tendermint.pdf [retrieved on Jul. 19, 2018], 11 pages.
Bonneau et al., SoK: Research Perspectives and Challenges for Bitcoin and Cryptocurrencies, International Association for Cryptologic Research vol. 20150323:173252, 18 pages (2015), DOI: 10.1109/SP.2015.14 [retrieved on Mar. 23, 2015].
Extended European Search Report issued by the European Patent Office for Application No. 18177127.0, dated Jul. 31, 2018, 10 pages.
Extended European Search Report issued by the European Patent Office for Application No. 18177129.6, dated Aug. 31, 2018, 12 pages.
Office Action issued by the Korean Patent Office for Application No. 10-2018-7008784, dated Aug. 22, 2018, 4 pages including English translation summary of OA.
Office Action issued by the Japanese Patent Office for Application No. 2018-521625, dated Sep. 26, 2018, 11 pages including English translation.
Invitation to Pay Additional Fees issued by the International Searching Authority for Application No. PCT/US18/41625, dated Sep. 18, 2018, 3 pages.
Non-Final Office Action issued by The United States Patent and Trademark Office for U.S. Appl. No. 16/032,652, dated Oct. 12, 2018, 32 pages.
Examination Report No. 2 issued by the Australian Patent Office for Application No. 2016316777, dated Oct. 30, 2018, 5 pages.
Notice of Eligibility for Grant and Supplementary Examination Report issued by the Intellectual Property Office of Singapore for Application No. 11201801311T, dated Nov. 26, 2018, 5 pages.
International Search Report and Written Opinion issued by the International Searching Authority for Application No. PCT/US18/41625, dated Nov. 20, 2018, 18 pages.
Examination Report No. 3 issued by the Australian Patent Office for Application No. 2016316777, dated Dec. 20, 2018, 5 pages.
Alfred V. Aho, John E. Hopcroft, and Jeffrey Ullman. 1983. Data Structures and Algorithms (1st ed.). Addison-Wesley Longman Publishing Co., Inc., Boston, MA, USA, 620 pages.
Notice of Preliminary Rejection issued by the Korean Patent Office for Application 10-2018-7008784, dated Dec. 28, 2018, 4 pages including English translation.
Office Action issued by the Canadian Patent Office for Application No. 3,027,398, dated Jan. 7, 2019, 7 pages.
Invitation to Pay Additional Fees issued by the International Searching Authority for Application No. PCT/US2018/058432, dated Jan. 16, 2019, 2 pages.
Notice of eligibility for Grant and Supplementary Examination Report issued by the Intellectual Property Office of Singapore for Application No. 10201805466S, dated Jan. 28, 2019, 5 pages.

Notice of Acceptance issued by the Australian Patent Office for Patent Application No. 2016316777, dated Feb. 19, 2019, 3 pages.
Notification of the First Office Action issued by the Chinese Patent Office for Patent Application No. 201680061456.6, dated Feb. 1, 2019, 18 pages including English translation.
Sompolinsky, Yonatan and Zohar, Aviv, "Secure High-Rate Transaction Processing in Bitcoin," International Conference on Financial Cryptography and Data Security (FC 2015), Springer,2015, 31 pages cited as 7(16):507-527,<DOI: 10.1007/978-3-662-47854-7_32>.
International Search Report and Written Opinion issued by the International Searching Authority for Application No. PCT/US18/58432, dated Mar. 29, 2019, 11 pages.
Supplementary Examination Report and Notice of Eligibility issued by the Singapore Patent Office for Application No. 10201805458P, dated Apr. 8, 2019, 5 pages.
Office Action issued by the European Patent Office for Application No. 16842700.3, dated Apr. 12, 2019, 10 pages.
Office Action issued by the European Patent Office for Application No. 18177122.1, dated Apr. 12, 2019, 9 pages.
Office Action issued by the Russian Patent Office for Application No. 2018110579, dated Apr. 4, 2019, 14 pages including English translation.
Non-final Office Action issued by The United States Patent and Trademark Office for U.S. Appl. No. 16/176,125, dated Apr. 26, 2019, 15 pages.
Boneh, "Functional Encryption: A New Vision for Public-Key Cryptography,"Communication of the ACM 55:56-64 (2012).
Office Action issued by the Australian Patent Office for Application No. 2019202138, dated May 15, 2019, 4 pages.
International Preliminary Report on Patentability dated Jun. 25, 2019 for International Application No. PCT/US1767329, 7 pages.
Office Action issued by the European Patent Office for Application No. 18177124.7, dated Jul. 15, 2019, 9 pages.
Office Action issued by the European Patent Office for Application No. 18177127.0, dated Jul. 15, 2019, 7 pages.
Non-Final Office Action issued by The United States Patent and Trademark Office for U.S. Appl. No. 16/405,069, dated Aug. 6, 2019, 13 pages.
Office Action issued by the Canadian Patent Office for Application No. 3,027,398, dated Aug. 12, 2019, 4 pages.
Non-Final Office Action issued by The United States Patent and Trademark Office for U.S. Appl. No. 15/366,584, dated Sep. 12, 2019, 6 pages.
Office Action issued by the Japanese Patent Office for Application No. 2019-081303, 4 pages including English translation.
Office Action issued by the European Patent Office for Application No. 16842700.3, dated Nov. 4, 2019, 10 pages.
Office Action issued by the European Patent Office for Application No. 18177122.1, dated Nov. 4, 2019, 9 pages.
Baird, "Hashgraph Consensus: Fair, Fast Byzantine Fault Tolerance," Swirlds Tech Report TR-2016-01, dated May 31, 2016, 24 pages.
Baird et al., "Hedera: A Governing Council & Public Hashgraph Network," Whitepaper, v.1.4, dated Oct. 17, 2018, 76 pages.
Baird, "Hashgraph Consensus: Detailed Examples," Swirlds Tech Report Swirlds-TR-2016-02, dated Dec. 11, 2016, 29 pages.
Office Action issued by the Australian Patent Office for Application No. 2018300147, dated Jan. 15, 2020 2 pages.
International Preliminary Report on Patentability issued by the International Searching Authority for Application No. PCT/US18/41625, dated Jan. 14, 2020, 7 pages.
Examination Report No. 1 issued by the Australian Patent Office for Application No. 2020200149, dated Jan. 29, 2020, 2 pages.
Final Office Action issued by The United States Patent and Trademark Office for U.S. Appl. No. 16/405,069, dated Mar. 6, 2020, 16 pages.
Office Action issued by the Korean Patent Office for Application No. KR10-2020-7003982, dated Feb. 24, 2020, 3 pages, Non-English.
Office Action, Ex Parte Quayle, issued by The United States Patent and Trademark Office for U.S. Appl. No. 15/906,668, dated Apr. 22, 2020, 7 pages.

(56) References Cited

OTHER PUBLICATIONS

International Preliminary Report on Patentability issued by the International Searching Authority for Application No. PCT/US2018/058432, dated May 5, 2020, 7 pages.
Extended European Search Report issued by the European Patent Office for Application No. 17883223.4, dated May 15, 2020, 14 pages.
Lerner, "DagCoin Draft," dated Sep. 11, 2015, 6 pages, Retrieved from the Internet: URL:https://bitslog.files.wordpress.com/2015/09/dagcoin-v41.pdf [retrieved on May 6, 2020].
Wikipedia webpage for Merkle Tree, Retrieved from the Internet: https://en.wikipedia.org/wiki/Merkle_tree, dated May 17, 2020, 5 pages.
Extended European Search Report issued by the European Patent Office for Application No. 17870565.3, dated May 25, 2020, 8 pages.
Office Action issued by the Russian Patent Office for Application No. 2020100003, dated May 29, 2020, 10 pages including English translation.
Office Action issued by the Korean Patent Office for Application No. 10-2020-7014386, dated Jun. 2, 2020, 4 pages including English translation.
Office Action issued by the Chinese Patent Office for Application No. 201910908046.6, dated Jun. 2, 2020, 19 pages including English translation.
Advisory Action issued by The United States Patent and Trademark Office for U.S. Appl. No. 16/405,069, dated Jul. 16, 2020, 10 pages.
Bitcoin—"you-need-to-know" archived Sep. 5, 2015 and retrieved from https://web.archive.org/web/20150905115130/https://bitcoin.org/en/you-need-to-know on Jul. 13, 2020, 2 pages.
International Search Report and Written Opinion issued by the International Searching Authority for Application No. PCT/US20/34197, dated Jul. 31, 2020, 13 pages.

* cited by examiner

Address Book 400

| DD Device | Public Key | Stake |
|---|---|---|
| 310 | A | 100 |
| 320 | B | 50 |
| 330 | C | 30 |
| 340 | D | 75 |

800

```
┌─────────────────────────────────────────┐
│ Calculating, at a first time and using  │
│ a first address book of a distributed   │
│ database implemented by a first set of  │
│ compute devices, an identifier for the  │
│ distributed database.                   │
│ 802                                     │
└─────────────────────────────────────────┘
                    ↓
┌─────────────────────────────────────────┐
│ Receiving a transaction to at least one │
│ of (1) add a compute device to the      │
│ first set of compute devices, (2)       │
│ remove a compute device from the first  │
│ set of compute devices, or (3) modify a │
│ compute device from the first set of    │
│ compute devices, to define a second set │
│ of compute devices.                     │
│ 804                                     │
└─────────────────────────────────────────┘
                    ↓
┌─────────────────────────────────────────┐
│ Defining, at a second time after the    │
│ first time, a second address book       │
│ including a public key associated with  │
│ each compute device from the second set │
│ of compute devices.                     │
│ 806                                     │
└─────────────────────────────────────────┘
                    ↓
┌─────────────────────────────────────────┐
│ Receiving, from a compute device from   │
│ the second set of compute devices, a    │
│ state proof associated with data of the │
│ distributed database after the second   │
│ time.                                   │
│ 808                                     │
└─────────────────────────────────────────┘
                    ↓
┌─────────────────────────────────────────┐
│ Verifying the data of the distributed   │
│ database by confirming that a           │
│ predetermined number of compute devices │
│ from the first set of compute devices   │
│ have digitally signed the second        │
│ address book.                           │
│ 810                                     │
└─────────────────────────────────────────┘
```

FIG. 8

METHODS AND APPARATUS FOR IMPLEMENTING STATE PROOFS AND LEDGER IDENTIFIERS IN A DISTRIBUTED DATABASE

CROSS-REFERENCE TO RELATED APPLICATIONS

This application claims priority to and the benefit of U.S. Provisional Application No. 62/851,368, filed May 22, 2019 and titled "Methods and Apparatus for Implementing State Proofs and Ledger Identifiers in a Distributed Database," which is incorporated herein by reference in its entirety.

BACKGROUND

Embodiments described herein relate generally to a database system and more particularly to methods and apparatus for implementing state proofs and ledger identifiers in a database system across multiple devices in a network.
Some known distributed database systems attempt to achieve consensus for values within a distributed database (e.g., regarding the order in which transactions occur or should be processed within such a distributed database). Consensus can be determined using various known consensus methods and/or processes. After an order is identified, the transactions can be processed to define a state of the distribute database and/or a state of data within the distribute database. Because multiple devices and/or participants of a distributed database can store a separate instance of the distributed database, it can be difficult to verify a state of the data within the distributed database at any given time.

Accordingly, a need exists for methods and apparatus for effectively and efficiently determining a state of a distributed database at a time.

SUMMARY

In some embodiments, a method can include calculating, at a first time, an identifier for a distributed database using a first address book of the distributed database. The first address book includes a public key associated with each compute device from a first set of compute devices that implements the distributed database at the first time. The method can further include receiving a transaction to at least one of (1) add a compute device to the first set of compute devices, (2) remove a compute device from the first set of compute devices, or (3) modify a compute device from the first set of compute devices, to define a second set of compute devices. The method can further include defining, at a second time after the first time, a second address book that includes a public key associated with each compute device from the second set of compute devices. The method can further include receiving, from a compute device from the second set of compute devices, a state proof associated with data of the distributed database after the second time. The method can further include verifying the data of the distributed database by confirming that a predetermined number of compute devices from the first set of compute devices have digitally signed the second address book.

BRIEF DESCRIPTION OF THE DRAWINGS

FIG. 8 is a flow chart of a method for verifying data within a distributed database, according to an embodiment.

DETAILED DESCRIPTION

Figure 1:
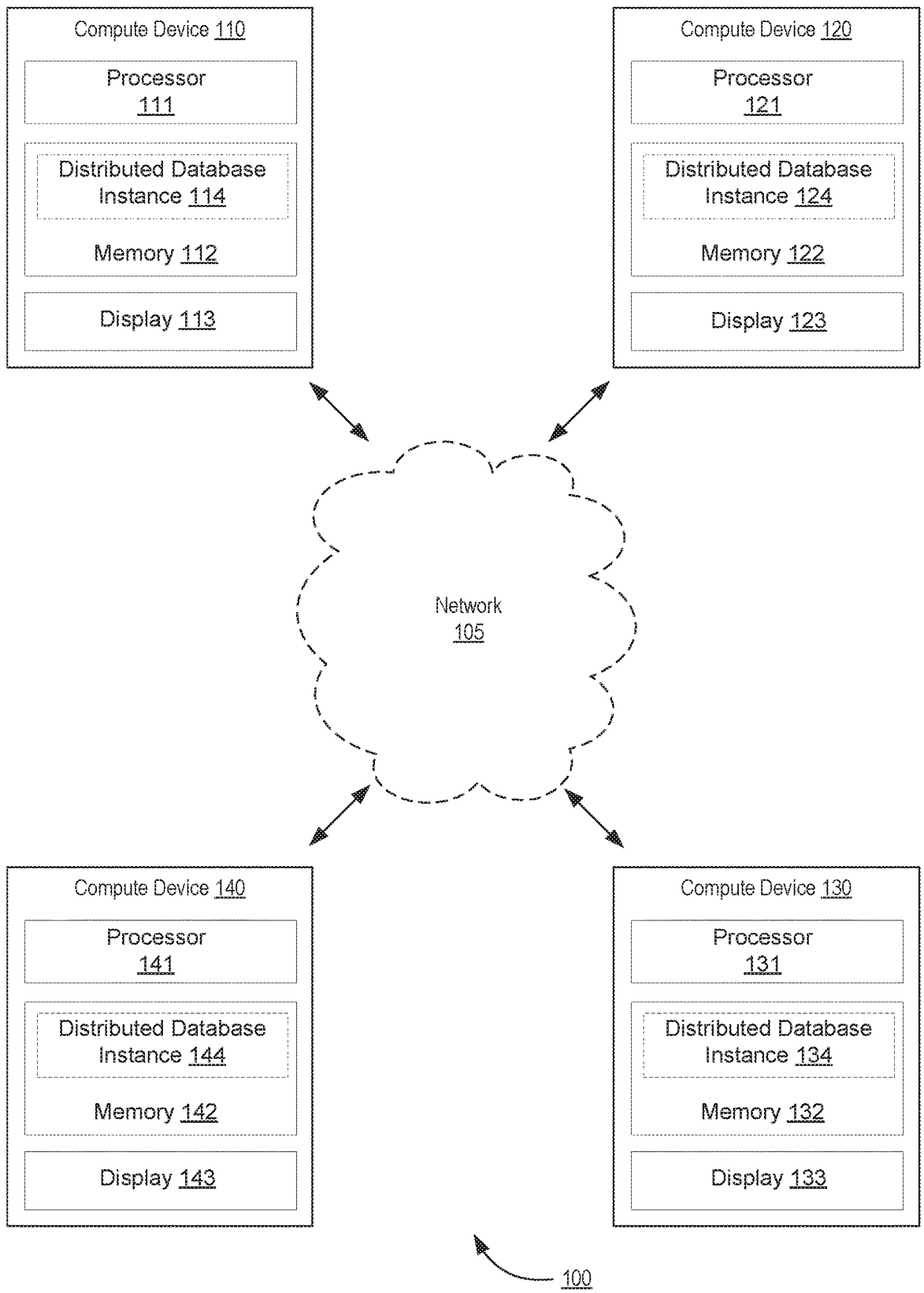
FIG. 1 is a block diagram that illustrates a distributed database system, according to an embodiment.

Non-limiting examples of various aspects and variations of the embodiments are described herein and illustrated in the accompanying drawings.

One or more embodiments described herein generally relate to methods, apparatus, and systems that implement a distributed database by defining a state of a distributed database as a Merkle tree, and further using state proofs and ledger identifiers to efficiently verify values within the distributed database. Methods, apparatus, and systems of implementing state proofs and ledger identifiers in a distributed database are disclosed.

In some embodiments, a method can include calculating, at a first time, an identifier for a distributed database using a first address book of the distributed database. The first address book includes a public key associated with each compute device from a first set of compute devices that implements the distributed database at the first time. The method can further include receiving a transaction to at least one of (1) add a compute device to the first set of compute devices, (2) remove a compute device from the first set of compute devices, or (3) modify a compute device from the first set of compute devices, to define a second set of compute devices. The method can further include defining, at a second time after the first time, a second address book that includes a public key associated with each compute device from the second set of compute devices. The method can further include receiving, from a compute device from the second set of compute devices, a state proof associated with data of the distributed database after the second time. The method can further include verifying the data of the distributed database by confirming that a predetermined number of compute devices from the first set of compute devices have digitally signed the second address book.

In some embodiments, an apparatus includes a memory and a processor operatively coupled to the memory. The memory is of a compute device associated with a distributed database implemented by a set of compute devices via a network operatively coupled to the set of compute devices. The processor is configured to receive, from a compute device from the set of compute devices, a state proof associated with a state of the distributed database. The state proof can include: (1) data associated with the state; (2) a timestamp associated with the state; (3) a first identifier of the distributed database; and (4) a set of address books associated with the distributed database. Each address book from the set of address books is associated with a version of the distributed database during a time period different from a time period associated with the version of the distributed database associated with each remaining address book from the set of address books. The set of address books has a chronological order. The processor is further configured to determine validity of the data at a time associated with the timestamp by: (1) verifying that the first identifier of the distributed database is correct based on a second identifier of the distributed database stored in the memory; (2) verifying that the data associated with the state has been digitally signed by a predetermined number of compute devices from the set of compute devices; and (3) other than an initial address book from the set of address books, verifying that each address book from the set of address books is digitally signed by a predetermined number of compute devices from a set of compute devices associated with an immediately preceding address book in the chronological order and from the set of address books.

In some embodiments, a non-transitory processor-readable medium stores code representing instructions to be executed by a processor. The code includes code to cause the processor to receive, from a compute device from a set of compute devices that implements a distributed database via a network, a state proof associated with a state of the distributed database. The state proof can include: (1) data stored as a set of leaf records of a Merkle tree of the state; (2) a Merkle path associated with the data; and (3) a set of address books associated with the distributed database. Each address book from the set of address books is associated with a version of the distributed database during a time period different from a time period associated with the version of the distributed database associated with each remaining address book from the set of address books. The set of address books has a chronological order. The code includes code to cause the processor to determine validity of the data by: (1) verifying the Merkle path as valid for a sequence from a root of the Merkle tree to the leaf record; and (2) other than an initial address book from the set of address books, verifying that each address book from the set of address books is digitally signed by a predetermined number of compute devices from a set of compute devices associated with an immediately preceding address book in the chronological order and from the set of address books.

As used herein, a module can be, for example, any assembly and/or set of operatively-coupled electrical components associated with performing a specific function, and can include, for example, a memory, a processor, electrical traces, optical connectors, software (executing in hardware) and/or the like.

As used in this specification, the singular forms "a," "an" and "the" include plural referents unless the context clearly dictates otherwise. Thus, for example, the term "module" is intended to mean a single module or a combination of modules. For instance, a "network" is intended to mean a single network or a combination of networks.

FIG. 1 is a high level block diagram that illustrates a distributed database system 100, according to an embodiment. FIG. 1 illustrates a distributed database 100 implemented across four compute devices (compute device 110, compute device 120, compute device 130, and compute device 140), but it should be understood that the distributed database 100 can use a set of any number of compute devices, including compute devices not shown in FIG. 1. The network 105 can be any type of network (e.g., a local area network (LAN), a wide area network (WAN), a virtual network, a telecommunications network) implemented as a wired network and/or wireless network and used to operatively couple compute devices 110, 120, 130, 140. As described in further detail herein, in some implementations, for example, the compute devices are personal computers connected to each other via an Internet Service Provider (ISP) and the Internet (e.g., network 105). In some implementations, a connection can be defined, via network 105, between any two compute devices 110, 120, 130, 140. As shown in FIG. 1, for example, a connection can be defined between compute device 110 and any one of compute device 120, compute device 130, or compute device 140.

In some implementations, the compute devices 110, 120, 130, 140 can communicate with each other (e.g., send data to and/or receive data from) and with the network via intermediate networks and/or alternate networks (not shown in FIG. 1). Such intermediate networks and/or alternate networks can be of a same type and/or a different type of network as network 105.

Each compute device 110, 120, 130, 140 can be any type of device configured to communicate over the network 105 (e.g., to send and/or receive data from one or more of the other compute devices), such as, for example, a computing entity (e.g., a personal computing device such as a desktop computer, a laptop computer, etc.), a mobile phone, a personal digital assistant (PDA), and so forth. Examples of compute devices are shown in FIG. 1. Compute device 110 includes a memory 112, a processor 111, and an output device 113. The memory 112 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some implementations, the memory 112 of the compute device 110 includes data associated with an instance of a distributed database (e.g., distributed database instance 114). In some implementations, the memory 112 stores instructions to cause the processor to execute modules, processes and/or functions associated with implementing state proofs and/or ledger identifiers (e.g., signing messages, defining a state proof, defining a Merkle tree, etc.) and/or sending to and/or receiving from another instance of a distributed database (e.g., distributed database instance 124 at compute device 120) a record of a synchronization event, and/or a record of prior synchronization events with other compute devices, an order of synchronization events, an order of transactions within events, parameters associated with identifying an order of synchronization events and/or transactions, and/or a value for a parameter (e.g., a database field quantifying a transaction, a database field quantifying an order in which events occur, and/or any other suitable field for which a value can be stored in a database).

Distributed database instance 114 can, for example, be configured to manipulate data, including storing, modifying, and/or deleting data. In some implementations, distributed database instance 114 can be a set of arrays, a set of data structures, a relational database, an object database, a post-relational database, and/or any other suitable type of database or storage. For example, the distributed database instance 114 can store data related to any specific function and/or industry. For example, the distributed database instance 114 can store financial transactions (of the user of the compute device 110, for example), including a value and/or a vector of values related to the history of ownership of a particular financial instrument. In general, a vector can be any set of values for a parameter, and a parameter can be any data object and/or database field capable of taking on different values. Thus, a distributed database instance 114 can have a number of parameters and/or fields, each of which is associated with a vector of values. The vector of values can be used to determine the actual value for the parameter and/or field within that database instance 114. In some instances, the distributed database instance 114 stores a record of a synchronization event, a record of prior synchronization events with other compute devices, an order of synchronization events, an order of transactions within events, parameters and/or values associated with identifying an order of synchronization events and/or transactions (e.g., used in calculating an order using a consensus method as described herein), a value for a parameter (e.g., a database field quantifying a transaction, a database field quantifying an order in which events occur, and/or any other suitable field for which a value can be stored in a database), and/or the like.

In some instances, the distributed database instance 114 can also store a database state variable and/or a current state. The current state can be a state, balance, condition, and/or the like associated with a result of the transactions. Similarly stated, the state can include the data structure and/or variables modified by the transactions. In some instances, the current state can be stored in a separate database and/or portion of memory 112. In some instances, the current state can be stored at a memory of a compute device different from compute device 110. In some instances, at least a portion of the state can be stored as a Merkle tree and/or a hash tree, as described in further detail herein.

In some instances, the distributed database instance 114 can also be used to implement other data structures, such as a set of (key, value) pairs. A transaction recorded by the distributed database instance 114 can be, for example, adding, deleting, or modifying a (key, value) pair in a set of (key, value) pairs.

In some instances, the distributed database system 100 or any of the distributed database instances 114, 124, 134, 144 can be queried. For example, a query can consist of a key, and the returned result from the distributed database system 100 or distributed database instances 114, 124, 134, 144 can be a value associated with the key. In some instances, the distributed database system 100 or any of the distributed database instances 114, 124, 134, 144 can also be modified through a transaction. For example, a transaction to modify the database can contain a digital signature by the party authorizing and/or requesting the modification of the transaction.

The distributed database system 100 can be used for many purposes, such as, for example, storing attributes associated with various users in a distributed identity system. For example, such a system can use a user's identity as the "key," and the list of attributes associated with the user as the "value." In some instances, the identity can be a cryptographic public key with a corresponding private key known to that user. Each attribute can, for example, be digitally signed by an authority having the right to assert that attribute. Each attribute can also, for example, be encrypted with the public key associated with an individual or group of individuals that have the right to read the attribute. Some keys or values can also have attached to them a list of public keys of parties that are authorized to modify or delete the keys or values.

In another example, the distributed database instance 114 can store data related to Massively Multiplayer Games (MMGs), such as the current status and ownership of gameplay items. In some instances, distributed database instance 114 can be implemented within the compute device 110, as shown in FIG. 1. In some instances, the instance of the distributed database is accessible by the compute device (e.g., via a network), but is not implemented in the compute device (not shown in FIG. 1).

The processor 111 of the compute device 110 can be any suitable processing device configured to run and/or execute distributed database instance 114. For example, the processor 111 can be configured to update distributed database instance 114 in response to receiving a signal from compute device 120, and/or cause a signal to be sent to compute device 120. More specifically, the processor 111 can be configured to execute modules, functions and/or processes to update the distributed database instance 114 in response to receiving a synchronization event associated with a transaction from another compute device, a record associated with an order of synchronization events, and/or the like. In some implementations, the processor 111 can be configured to execute modules, functions and/or processes to update the distributed database instance 114 in response to receiving a value for a parameter stored in another instance of the distributed database (e.g., distributed database instance 124 at compute device 120), and/or cause a value for a parameter stored in the distributed database instance 114 at compute device 110 to be sent to compute device 120. In some implementations, the processor 111 can be configured to execute modules, functions and/or processes described herein with respect to implementing state proofs and/or ledger identifiers (e.g., signing messages, defining a state proof, defining a Merkle tree, etc.). In some implementations, the processor 111 can be a general purpose processor, a Field Programmable Gate Array (FPGA), an Application Specific Integrated Circuit (ASIC), a Digital Signal Processor (DSP), and/or the like.

The display 113 can be any suitable display, such as, for example, a liquid crystal display (LCD), a cathode ray tube display (CRT) or the like. In some implementations, any of compute devices 110, 120, 130, 140 includes another output device instead of or in addition to the displays 113, 123, 133, 143. For example, any one of the compute devices 110, 120, 130, 140 can include an audio output device (e.g., a speaker), a tactile output device, and/or the like. In some implementations, any of compute devices 110, 120, 130, 140 includes an input device instead of or in addition to the displays 113, 123, 133, 143. For example, any of the compute devices 110, 120, 130, 140 can include a keyboard, a mouse, and/or the like.

While shown in FIG. 1 as being within a single compute device, in some instances the processor configured to execute modules, functions and/or processes to update the distributed database can be within a compute device separate from its associated distributed database. In such an instance, for example, a processor can be operatively coupled to a distributed database instance via a network. For example, the processor can execute a consensus method to identify an order of events and/or transactions (e.g., as a result of synchronization with the other distributed database instances) and can send a signal including the order of events and/or transactions to the associated distributed database instance over the network. The associated distributed database instance can then store the order of events, the order of the transactions and/or a state variable based on the order of transactions in the associated distributed database instance. As such, the functions and storage associated with the distribute database can be distributed. Moreover, the processor can query its associated distributed database instance, store database state variables and/or current states, and/or perform other suitable operations described herein in its distributed database instance even when the database is implemented in a compute device separate from a compute device having a processor implementing the modules, functions and/or processes (e.g., consensus method) associated with the distributed database system. In some instances, the functions and/or methods described herein can be executed across any number of compute devices (e.g., within a distributed computing environment and/or cluster) and the results and/or values of such functions and/or methods can be stored at a memory and/or storage at any suitable compute device.

The compute device 120 has a processor 121, a memory 122, and a display 123, which can be structurally and/or functionally similar to the processor 111, the memory 112, and the display 113, respectively. Also, distributed database instance 124 can be structurally and/or functionally similar to distributed database instance 114.

The compute device 130 has a processor 131, a memory 132, and a display 133, which can be structurally and/or functionally similar to the processor 111, the memory 112, and the display 113, respectively. Also, distributed database instance 134 can be structurally and/or functionally similar to distributed database instance 114.

The compute device 140 has a processor 141, a memory 142, and a display 143, which can be structurally and/or functionally similar to the processor 111, the memory 112, and the display 113, respectively. Also, distributed database instance 144 can be structurally and/or functionally similar to distributed database instance 114.

Even though compute devices 110, 120, 130, 140 are shown as being similar to each other, each compute device of the distributed database system 100 can be different from the other compute devices. Each compute device 110, 120, 130, 140 of the distributed database system 100 can be any one of, for example, a computing entity (e.g., a personal computing device such as a desktop computer, a laptop computer, etc.), a mobile phone, a personal digital assistant (PDA), and so forth. For example, compute device 110 can be a desktop computer, compute device 120 can be a smartphone, and compute device 130 can be a server.

In some implementations, one or more portions of the compute devices 110, 120, 130, 140 can include a hardware-based module (e.g., a digital signal processor (DSP), a field programmable gate array (FPGA)) and/or a software-based module (e.g., a module of computer code stored in memory and/or executed at a processor). In some implementations, one or more of the functions associated with the compute devices 110, 120, 130, 140 (e.g., the functions associated with the processors 111, 121, 131, 141) can be included in one or more modules (see, e.g., FIG. 2).

The properties of the distributed database system 100, including the properties of the compute devices (e.g., the compute devices 110, 120, 130, 140), the number of compute devices, and the network 105, can be selected in any number of ways. In some instances, the properties of the distributed database system 100 can be selected by an administrator of distributed database system 100. In some instances, the properties of the distributed database system 100 can be collectively selected by the users of the distributed database system 100.

Because a distributed database system 100 is used, no leader is appointed among the compute devices 110, 120, 130, and 140. Specifically, none of the compute devices 110, 120, 130, or 140 are identified and/or selected as a leader to settle disputes between values stored in the distributed database instances 111, 12, 131, 141 of the compute devices 110, 120, 130, 140. Instead, using the event synchronization processes, the voting processes and/or methods described herein, the compute devices 110, 120, 130, 140 can collectively converge on a value for a parameter.

Not having a leader in a distributed database system increases the security of the distributed database system. Specifically, with a leader there is a single point of attack and/or failure. If malicious software infects the leader and/or a value for a parameter at the leader's distributed database instance is maliciously altered, the failure and/or incorrect value is propagated throughout the other distributed database instances. In a leaderless system, however, there is not a single point of attack and/or failure. Specifically, if a parameter in a distributed database instance of a leaderless system contains a value, the value will change after that distributed database instance exchanges values with the other distributed database instances in the system, as described in further detail herein. Additionally, the leaderless distributed database systems described herein increase the speed of convergence while reducing the amount of data sent between devices as described in further detail herein.

Figure 2:
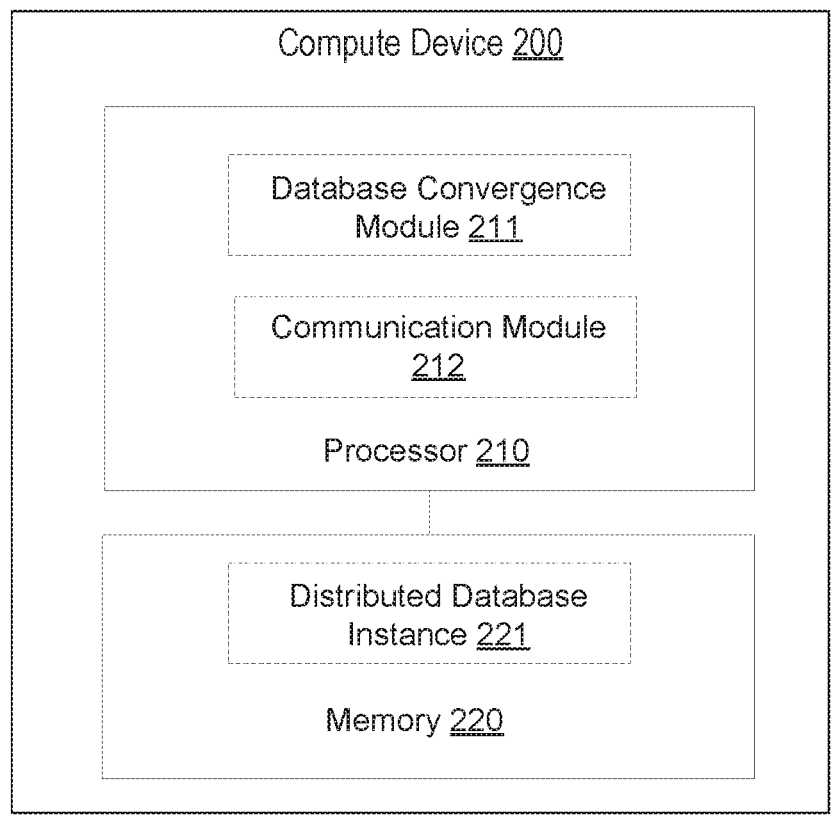
FIG. 2 is a block diagram that illustrates a compute device of a distributed database system, according to an embodiment.

FIG. 2 illustrates a compute device 200 of a distributed database system (e.g., distributed database system 100), according to an embodiment. In some implementations, compute device 200 can be similar to compute devices 110, 120, 130, 140 shown and described with respect to FIG. 1. Compute device 200 includes a processor 210 and a memory 220. The processor 210 and memory 220 are operatively coupled to each other. In some implementations, the processor 210 and memory 220 can be similar to the processor 111 and memory 112, respectively, described in detail with respect to FIG. 1. As shown in FIG. 2, the processor 210 includes a database convergence module 211 and communication module 210, and the memory 220 includes a distributed database instance 221. The communication module 212 enables compute device 200 to communicate with (e.g., send data to and/or receive data from) other compute devices. In some implementations, the communication module 212 (not shown in FIG. 1) enables compute device 110 to communicate with compute devices 120, 130, 140. Communication module 210 can include and/or enable, for example, a network interface controller (NIC), wireless connection, a wired port, and/or the like. As such, the communication module 210 can establish and/or maintain a communication session between the compute device 200 and another device (e.g., via a network such as network 105 of FIG. 1 or the Internet (not shown)). Similarly stated, the communication module 210 can enable the compute device 200 to send data to and/or receive data from another device.

In some instances, the database convergence module 211 can exchange events and/or transactions with other computing devices, store events and/or transactions that the database convergence module 211 receives, and calculate an ordering of the events and/or transactions based on the partial order defined by the pattern of references between the events. Each event can be a record containing a cryptographic hash of two earlier events (linking that event to the two earlier events and their ancestor events, and vice versa), payload data (such as transactions that are to be recorded), other information such as the current time, a timestamp (e.g., date and UTC time) that its creator asserts is the time the event was first defined, and/or the like. Each of the communicating compute devices are called "members" or "hashgraph members". In some instances, the first event defined by a member only includes a hash (or hash value) of a single event defined by another member. In such instances, the member does not yet have a prior self-hash (e.g., a hash of an event previously defined by that member). In some instances, the first event in a distributed database does not include a hash of any prior event (since there is no prior event for that distributed database).

In some implementations, such a cryptographic hash of the two earlier events can be a hash value defined based on a cryptographic hash function using an event as an input. Specifically, in such implementations, the event includes a particular sequence or string of bytes (that represent the information of that event). The hash of an event can be a value returned from a hash function using the sequence of bytes for that event as an input. In some implementations, any other suitable data associated with the event (e.g., an identifier, serial number, the bytes representing a specific portion of the event, etc.) can be used as an input to the hash function to calculate the hash of that event. Any suitable hash function can be used to define the hash. In some implementations, each member uses the same hash function such that the same hash is generated at each member for a given event. The event can then be digitally signed by the member defining and/or creating the event.

In some instances, the set of events and their interconnections can form a Directed Acyclic Graph (DAG). In some instances, each event in a DAG references (e.g., contains a reference to) zero or more (e.g., two) earlier events (linking that event to the earlier events and their ancestor events and vice versa), and each reference is strictly to earlier ones, so that there are no loops. In some implementations, the DAG is based on cryptographic hashes, so the data structure can be called a hashgraph (also referred to herein as a "hashDAG"). The hashgraph directly encodes a partial order, meaning that event X is known to come before event Y if Y contains a hash of X, or if Y contains a hash of an event that contains a hash of X, or for such paths of arbitrary length. If, however, there is no path from X to Y or from Y to X, then the partial order does not define which event came first. Therefore, the database convergence module can calculate a total order from the partial order. This can be done by any suitable deterministic function that is used by the compute devices, so that the compute devices calculate the same order. In some implementations, each member can recalculate this order after each sync, and eventually these orders can converge so that a consensus emerges.

A consensus algorithm and/or method can be used to determine the order of events in a hashgraph and/or the order of transactions stored within the events. In some implementations, for example, the consensus algorithms and/or methods shown and described in U.S. patent application Ser. No. 15/387,048, filed Dec. 21, 2016 and titled "Methods and Apparatus for a Distributed Database within a Network," now U.S. Pat. No. 9,646,029, can be used to determine the order of events and/or transactions.

The order of transactions in turn can define a state of a database as a result of performing those transactions according to the order. The defined state of the database can be stored as a database state variable. In some implementations, the instance of the distributed database (e.g., distributed database instance 114) stores the hashgraph, and/or the transactions, and/or the order of transactions, and/or the events, and/or the order of the events, and/or the state resulting from performing transactions.

In FIG. 2, the database convergence module 211 and the communication module 212 are shown in FIG. 2 as being implemented in processor 210. In some implementations, the database convergence module 211 and/or the communication module 212 can be implemented in memory 220. In some implementations, the database convergence module 211 and/or the communication module 212 can be hardware based (e.g., ASIC, FPGA, etc.).

Figure 3:
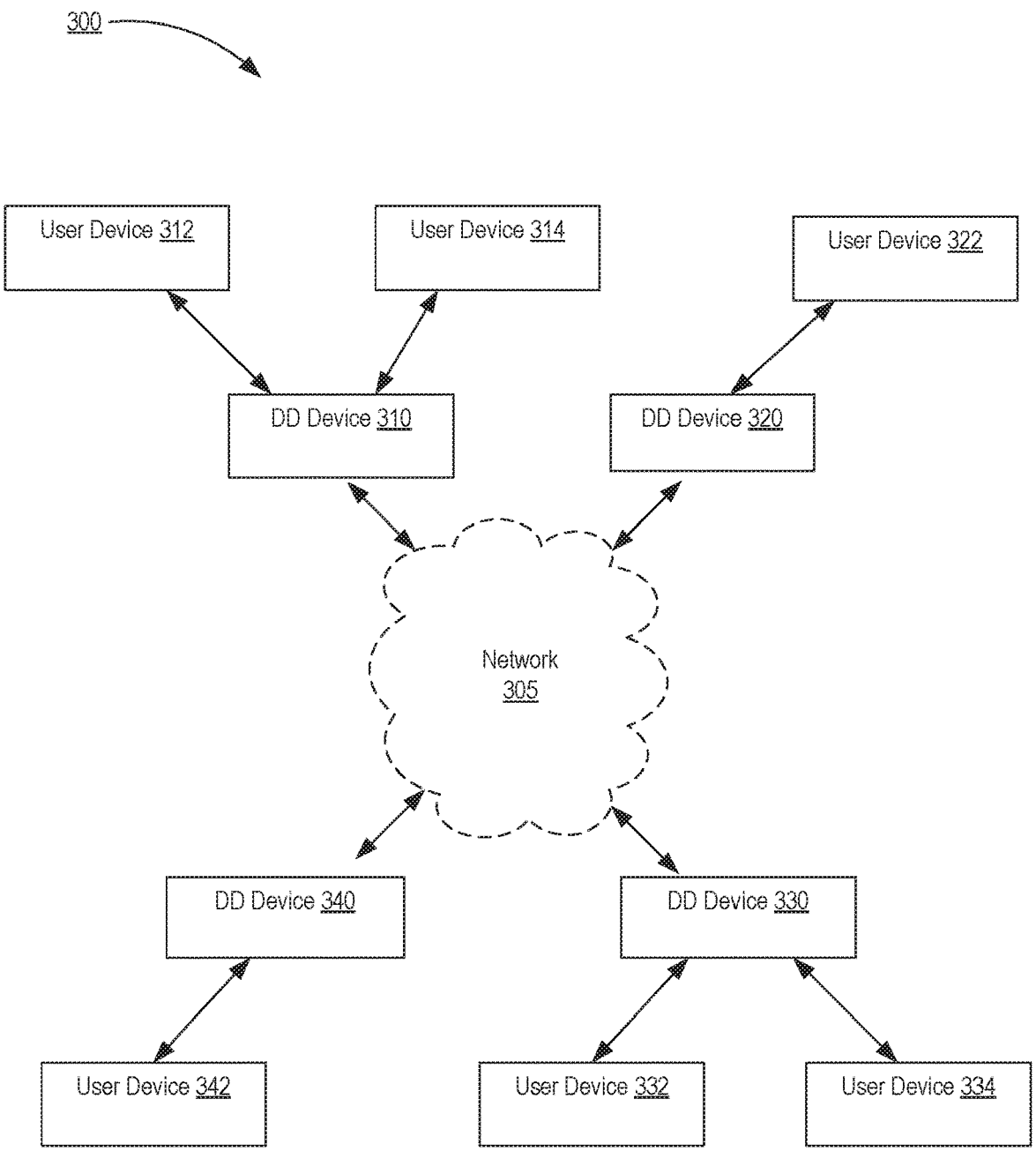
FIG. 3 is a block diagram that illustrates a distributed database system, according to an embodiment.

FIG. 3 is a block diagram that illustrates a distributed database system 300 (similar to the distributed database system 100, shown and described with respect to FIG. 1), according to an embodiment. The distributed database system 300 can be implemented using a set of distributed database devices 310, 320, 330, 340 (structurally and/or functionally similar to the compute devices 110, 120, 130, 140, shown and described with respect to FIG. 1) connected via a network 305 (structurally and/or functionally similar to the network 105, shown and described with respect to FIG. 1). Each distributed database device from the set of distributed database devices 310, 320, 330, 340 can store an instance of a distribute database, execute a consensus method and/or protocol to identify an order of events and/or transactions in the distributed database, exchange events with other distributed database devices from the set of distributed database devices 310, 320, 330, 340, and/or perform other actions associated with implementing the distributed database (as described with respect to the compute devices 110, 120, 130, 140 of FIG. 1). As such, distributed database devices 310, 320, 330, 340 can be said to collectively implement the distributed database and/or to be said to be devices or members of the distributed database. In some implementations, any number of distributed database devices can be used to implement the distributed database.

Each distributed database device from the set of distributed database devices 310, 320, 330, 340 can be connected and/or operatively coupled to one or more user devices from a set of user devices 312, 314, 322, 332, 334, 342. More specifically, as shown in FIG. 3, distributed database device 310 can be connected and/or operatively coupled to user devices 312 and 314; distributed database device 320 can be connected and/or operatively coupled to user device 322; distributed database device 330 can be connected and/or operatively coupled to user devices 332 and 334; and distributed database device 340 can be connected and/or operatively coupled to user device 342. While shown in FIG. 3 as being coupled to one or two user devices, each distributed database device can be connected and/or operatively coupled to any number of user devices.

Each user device from the set of user devices 312, 314, 322, 332, 334, 342 can be any suitable compute device such as, for example, a personal computer, a smartphone, a tablet, a server, and/or the like. As such, the set of user devices 312, 314, 322, 332, 334, 342 can include a processor and a memory (not shown in FIG. 3). The processor can be any suitable processor such as, for example, a general purpose processor, an FPGA, an ASIC, a DSP, and/or the like. The memory can be any suitable memory that stores instructions to be executed by the processor. The processor and memory can be operatively coupled to each other. The set of user devices 312, 314, 322, 332, 334, 342 can further include a communication module (not shown in FIG. 3), which can enable each user device to communicate with (e.g., send data to and/or receive data from) its respective distributed database device 310, 320, 330, 340. More specifically, user devices 312 and 314 can send and/or receive data from distributed database device 310; user device 322 can send and/or receive data from distributed database device 320; user devices 332 and 334 can send and/or receive data from distributed database device 330; and user device 342 can send and/or receive data from distributed database device 340.

The user devices 312, 314, 322, 332, 334, 342 can access and/or interact with the distributed database via one or more of the distributed database devices 310, 320, 330, 340. More specifically, the user devices 312 and 314 can access and/or interact with the distributed database via distributed database device 310; the user device 332 can access and/or interact with the distributed database via distributed database device 320; the user devices 332 and 334 can access and/or interact with the distributed database via distributed database device 330; and the user device 342 can access and/or interact with the distributed database via distributed database device 340. For example, user device 312 can make a change to and/or add a transaction to the distributed database via distributed database device 340. Similarly stated, user device 312 can send a transaction request to distributed database device 310 requesting distributed database device 310 to add a transaction to the distributed database. As another example, user device 312 can obtain state proofs from the distributed database device 310 to verify data in the distributed database, as described in further detail herein. Because the user devices 312, 314, 322, 332, 334, 342 are not members of the distributed database, but access the distributed database via members, the user devices 312, 314, 322, 332, 334, 342 do not perform consensus methods or otherwise factor into the consensus of the events and/or transactions in the distributed database.

Just as transactions can change data and/or state in the distributed database (as described with respect to FIG. 1), the transactions can also modify the membership of the distributed database (e.g., the set of distributed database devices implementing the distributed database) by adding, removing, and/or modifying members of the distributed database. In some implementations, the members of the distributed database can change over time by adding and/or removing one or more distributed database devices from the set of distributed database devices 310, 320, 330, 340. Similarly stated, the set of distributed database devices 310, 320, 330, 340 implementing the distributed database can change over time, as distributed database devices from the set of distributed database devices 310, 320, 330, 340 are removed from the set of distributed database devices 310, 320, 330, 340, and/or other distributed database devices are added to the set of distributed database devices 310, 320, 330, 340. In some instances, the removed distributed database devices can reconnect to the distributed database system at a later time.

Figures 4, 5:
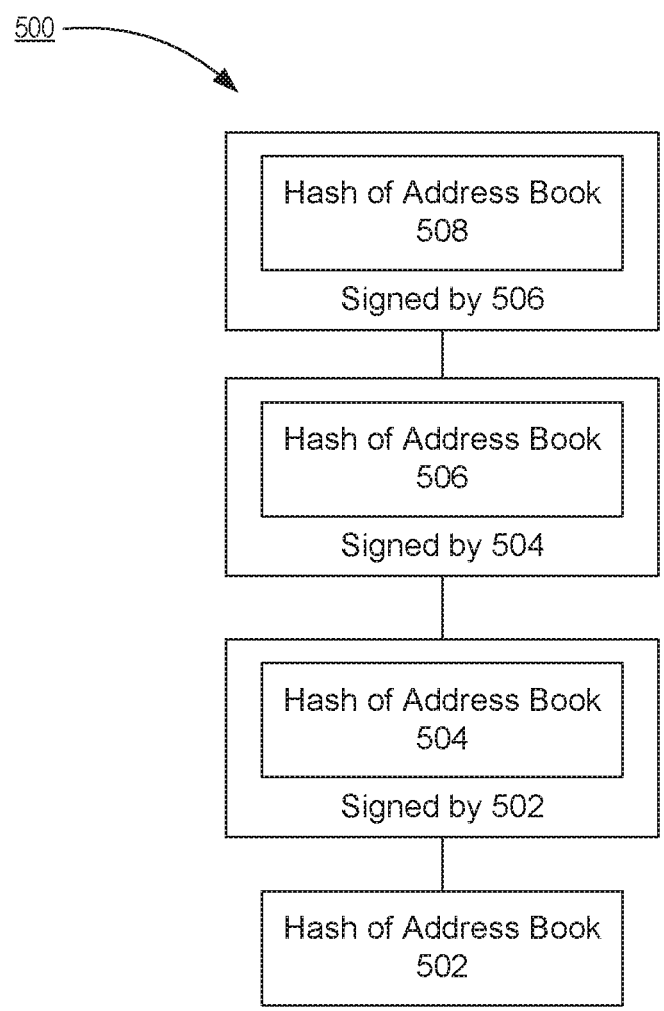
FIG. 4 illustrates an address book associated with a distributed database system, according to an embodiment.
FIG. 5 illustrates an address book history associated with a distributed database system, according to an embodiment.

An address book can be used to keep track of the members of a distributed database (i.e., the distributed database devices implementing the distributed database) at any given time. FIG. 4 illustrates an address book 400 associated with a distributed database system, according to an embodiment. The address book 400 includes an entry for each of the distributed database devices 310, 320, 330, 340 in distributed database system 300 of FIG. 3. Specifically, the address book is defined to include a set of the public keys (A, B, C and D) of a set of distributed database devices (distributed database devices 310, 320, 330, 340 as shown and described with respect to FIG. 3) that implement a distributed database. In implementations in which stake is used to determine consensus (e.g., the stake of a device indicates an amount of influence that device has over the consensus process), the address book 400 can also include an amount of stake associated with each distributed database device.

When transactions add, remove and/or modify distributed database devices from the set of distributed database devices, the transactions can change and/or update the address book. For example, if a transaction to remove distributed database device 340 from the distributed database is entered into the distributed database and ordered (e.g., within a consensus order of the distributed database), the transaction can be executed and distributed database device 340 can be removed from the distributed database. In response to this transaction, a new address book can be defined that does not include an entry for distributed database device 340. For another example, if a transaction to add a new distributed database device to the distributed database is entered into the distributed database and ordered (e.g., within a consensus order of the distributed database), a new address book with an entry (e.g., including a public key and an amount of stake) can defined for the new distributed database device. For yet another example, if a transaction to change an amount of stake associated with one or more distributed database devices is entered into the distributed database and ordered, a new address book reflecting the change in stake can be defined. For example, if the stake reflects an amount of cryptocurrency coins held by each distributed database instance, a transaction can reflect distributed database device 340 transferring 5 coins to distributed database device 330. After the transaction is ordered and executed, a new address book can be defined reflecting that distributed database device 340 now has 70 coins while distributed database device 330 has 35 coins.

FIG. 5 illustrates an address book history 500 associated with a distributed database system, according to an embodiment. The address book history 500 can be a record of each address book for a distributed database. Specifically, each time a new address book is defined (e.g., per the above), a hash (or hash value calculated using the address book as an input to a hash function) of that address book can be added to the address book history 500 (e.g., as a chain). Thus, the address book history can have a chronological order and each address book in the address book history can be applicable and/or accurate for a version of the distributed database for successive time periods. For example, address book 502 can be associated with a version of the distributed database during a first time period, address book 504 can be associated with a version of the distributed database during a second time period subsequent to the first time period, address book 506 can be associated with a version of the distributed database during a third time period subsequent to the second time period, and address book 508 can be associated with a version of the distributed database during a fourth time period subsequent to the third time period. Accordingly, in the chronological order, the address book 502 can be ordered first, the address book 504 can be ordered second, the address book 506 can be ordered third and the address book 508 can be ordered fourth.

Moreover, the hash (or hash value) of the address book can be digitally signed (e.g., using private keys) by a predefined threshold number of distributed database devices of the immediately preceding address book. Such signatures can attest to the validity of the new address book. In some instances, each distributed database device can individually sign the hash of the address book. In some instances, the signatures of multiple distributed database devices can be aggregated to define an aggregate signature. Other devices (e.g., other distributed database devices or user devices) can verify the signature(s) using the public key(s) of the distributed database devices signing the hash of the address book.

The predetermined threshold can be based on a total number of distributed database devices in the immediately preceding address book or based on an amount of stake held by each distributed database device in the immediately preceding address book. Moreover, the predetermined threshold can be any suitable threshold. For example, the predetermined threshold can be associated with two-thirds of the total stake in the distributed database. In some instances, the predetermined threshold can be any other suitable percentage of distributed database devices and/or stake (e.g., 67%, 70%, 80%, 90%, 99%, two third, three fourth, and/or the like). Referring to FIG. 4, in one example, if the predetermined threshold is two-thirds of the total stake in the distributed database and both distributed database devices 310 and 340 with public keys A and D and stakes of 100 and 75, respectively, sign a new address book (e.g., separately and/or with an aggregate signature), the address book can be found to be valid. Specifically, in such an example, the combined stake of 175 is more than two-thirds of the total stake of the distributed database of 255. For another example, if the predetermined threshold is two-thirds of the total members of the distributed database (rather than stake), any three of the four distributed database devices would need to sign the new address book for the new address book to be valid.

Returning to FIG. 5, the initial or genesis address book 502 can be hashed to produce a ledger identifier for the distributed database. Similarly stated, the initial or genesis address book 502 can be used as an input to a hash function to generate a hash (or hash value) that can be the ledger identifier. This ledger identifier can later be used as a unique identifier for the distributed database, as described herein. When a transaction changes the address book 502 (e.g., adds a member, removes a member or modifies the stake of a member), a hash of the new address book 504 can be signed by a predetermined number (based on total number or an amount of stake) of distributed database devices from the address book 502. Similarly, when a transaction changes the address book 504, a hash of the new address book 506 can be signed by a predetermined number (based on total number or amount of stake) of distributed database devices from the address book 504 and when a transaction changes the address book 506, a hash of the new address book 508 can be signed by a predetermined number (based on total number or amount of stake) of distributed database devices from the address book 506. Thus, the validity of each address book can easily be traced to the initial and/or genesis address book using the address book history 500.

As indicated above, each distributed database device from the set of distributed database devices 310, 320, 330, 340 can include a distributed database instance (similar to the distributed database instance 114, 124, 134, 144 as shown and described with respect to FIG. 1) storing data such as, for example, a consensus order of transactions and/or events and/or a state of the distributed database after the transactions have been executed in the consensus order. The order of transactions and/or events can define a state of the distributed database stored as a database state variable. In some implementations, the state of the distributed database can be partitioned into pieces, each of which can be stored as a leaf record in a Merkle tree.

Figure 6:
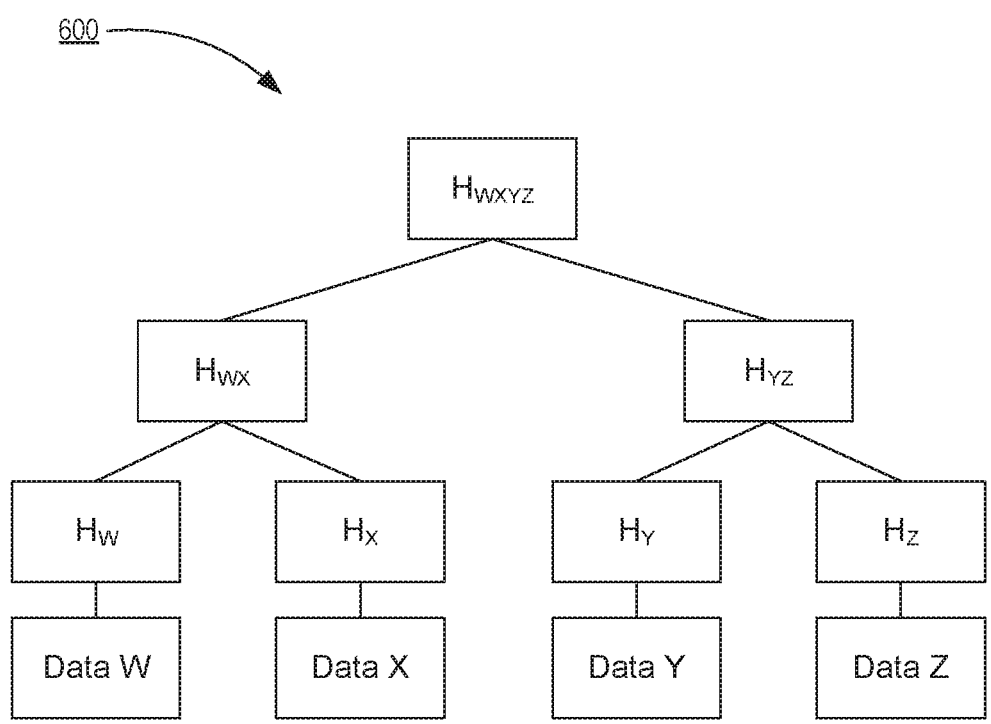
FIG. 6 illustrates a Merkle tree associated with a distributed database system, according to an embodiment.

A Merkle tree is a binary tree of hashes. FIG. 6 illustrates a Merkle tree 600 with data stored at each leaf node (i.e., Data W, Data X, Data Y and Data Z) of the Merkle tree 600. The other nodes within the Merkle tree 600 contain a hash (or hash value) of the concatenated contents of that node's child nodes. For example, node $H_W$ contains a hash of Data W ($H_W$'s sole child); node $H_X$ contains a hash of Data X; node $H_Y$ contains a hash of Data Y; and node $H_Z$ contains a hash of Data Z. Moreover, node $H_{WX}$ contains a hash of concatenated $H_W$ and $H_X$; node $H_{YZ}$ contains a hash of concatenated $H_Y$ and $H_Z$; and the root node of the Merkle tree 600 $H_{WXYZ}$ contains a hash of concatenated $H_{WX}$ and $H_{YZ}$.

Data can be verified as being contained in a leaf node of the Merkle tree 600 using the data, a Merkle path of the data, and the root node. A Merkle path of the data includes each sibling node of the nodes in a sequence from the data to the root node of the Merkle tree. For example, a Merkle path of Data W includes $H_X$ and $H_{YZ}$ (the sibling nodes of the nodes $H_W$ and $H_{WX}$, respectively, with $H_W$ and $H_{WX}$ being the sequence of nodes from Data W to the root node $H_{WXYZ}$). Specifically, based on the nodes in the Merkle path of Data W (i.e., nodes $H_X$ and $H_{YZ}$) and the root node $H_{WXYZ}$, a user can verify that Data W is in the Merkle tree 600. For example, $H_W$ can be calculated based on a hash of Data W; $H_{WX}$ can be calculated based on a hash of $H_W$ (previously calculated) and $H_X$ (provided as part of the Merkle path); and $H_{WXYZ}$ can be calculated based on a hash of $H_{WX}$ (previously calculated) and $H_{YZ}$ (provided as part of the Merkle path). Once $H_{WXYZ}$ is calculated, this can be compared to a previously stored and/or provided value of the root node. If the calculated root node corresponds to the previously stored and/or provided value of the root node, Data X is verified as being contained within the Merkle tree having that root node $H_{WXYZ}$.

Returning to FIG. 3, as discussed above, the state of a distributed database can be stored as a Merkle tree. Specifically, data associated with the state of the distributed database can be stored as leaf nodes in a Merkle tree. Periodically and/or sporadically, the set of distributed database devices 310, 320, 330, 340 implementing a distributed database (or a subset thereof) can digitally sign the root node of a current Merkle tree (i.e., a Merkle tree containing the current state of the distributed database), along with a consensus timestamp for a date and time at which the data is valid. Each distributed database device 310, 320, 330, 340 signing the root node of the Merkle tree can send its signature to the remaining distributed database devices form the set of distributed database devices implementing the distributed database. If a threshold number (based on total number or an amount of stake) of distributed database devices 310, 320, 330, 340 sign the root node of the Merkle tree, then that set of signatures is considered sufficient to prove that the Merkle tree root hash for the state of the distributed database is valid at the time of the given timestamp. In some instances, each distributed database device can individually sign the root node of the Merkle tree. In some instances, the signatures of multiple distributed database devices can be aggregated to define an aggregate signature. Other devices (e.g., other distributed database devices or user devices) can verify the signature(s) using the public key(s) of the distributed database devices signing the root node of the Merkle tree.

In some implementations, a Merkle tree (e.g., the state of the distributed database at a given time) can be stored and/or implemented in the set of distributed database devices 310, 320, 330, 340 implementing the distributed database. In such implementations, the Merkle tree or the state of the distributed database is not stored in the set of user devices 312, 314, 322, 332, 334, 342. Instead, the Merkle tree and/or the state of the distributed database can be accessed by the set of user devices 312, 314, 322, 332, 334, 342 by sending a request to a connected distributed database device 310, 320, 330, 340. Moreover, a distributed database device from the set of distribution database devices 310, 320, 330, 340 and/or a user device from the set of user devices 312, 314, 322, 332, 334, 342 can determine validity of data in a leaf node of the Merkle tree using a state proof.

A state proof can be used to verify that data is contained within a state of the distributed database at a time. In some implementations, a state proof can be a data structure, message and/or file that includes, for example:

Data from the distributed database (e.g. contents of a leaf node of a Merkle tree);

A Merkle path for that leaf node;

A timestamp for when the Merkle tree is valid;

A set of digital signatures (e.g., meeting a predetermined threshold) of distributed database devices implementing the distributed database (either separate or a combined aggregate signature) on a root node of the Merkle tree;

A current address book of the distributed database;

An address book history from the current address book to the initial and/or genesis address book of the distributed database; and/or A ledger identifier (i.e., a hash of the initial and/or genesis address book).

In some implementations, any portion of the data in the state proof and/or a hash (or hash value) of any portion of the data in the state proof can be signed. For example, in some implementations, the data from the distributed database (e.g., the contents of a leaf node of a Merkle tree) or a hash value of the data can be signed by a predetermined number of distributed database devices implementing the distributed database (either separate or a combined aggregate signature). Moreover, in some implementations, the timestamp, current address book, address book history, ledger identifier and/or any other portion of the state proof (or hash value of any portion of the state proof) can be signed by a predetermined number of distributed database devices implementing the distributed database (either separate or a combined aggregate signature). Such signatures can be used to verify the state proof is valid (e.g., using the public key(s) of the signing distributed database devices).

In some implementations, the state proof can be requested by a user device (e.g., user devices 312, 314, 322, 332, 334, 342) to verify that the distributed database contains specific data. Specifically, the user device can request the distributed database device (e.g., distributed database device 310, 320, 330, 340) to which it is connected to provide a state proof for a given piece of data. The user device (e.g., a processor of the user device) can then verify that the state proof is correct and that the distribute database truly contains the data in the Merkle tree leaf node as of the time of the given timestamp. Specifically, in some instances the user device (e.g., a processor of the user device) can verify the state proof by:

Verifying that the ledger identifier in the state proof matches a known ledger identifier for the distributed database (e.g., stored in a memory of the user device);

Verifying that the ledger identifier corresponds to the hash of the initial and/or genesis address book from the address book history of the state proof;

Verifying that each address book in the address book history of the state proof (other than the initial and/or genesis address book) is signed by a threshold number (based on total number or an amount of stake) of distributed database devices in the immediately preceding address book in the address book history of the state proof;

Verifying that the Merkle tree root, the state proof, the data in the state proof, and/or the timestamp of the state proof is/are signed by a threshold number (based on total number or an amount of stake) of distributed database devices from the current address book of the distributed database; and/or Verifying that the Merkle path for the leaf node of the Merkle tree storing the data is valid for a sequence from the root of the Merkle tree to the leaf record.

After such a verification, the user device (e.g., processor of the user device) can confirm that the data in the Merkle tree leaf and that is part of the state proof is valid and in the distributed database as of the timestamp. If such a verification succeeds, the user device (e.g., processor of the user device) can process the data (e.g., perform any other applicable actions on the data) as valid. For example, the user device can store the data in a local database, use the data in future calculations, and/or the like. If such a verification fails, the user device (e.g., processor of the user device) can discard and/or flag the data as being invalid. If the data is identified as invalid, the user device can flag a device that is the source of the data as untrustworthy, the user device can provide a notification to an associate distributed database device that the source of the data is untrustworthy, the user device can determine not to store the data, the user device can determine not to use the data in future calculations, an alert can be automatically provided to a user of the user device about the data being invalid, and/or the like.

If a supermajority (e.g., two-thirds) of the set of distributed database devices are honest (e.g., do not copy, fork, and/or split an original distributed database) at every point in time, then there can be only one distributed database for a given ledger identifier. If a user tries to generate a copy of, fork, and/or split an original distributed database, in violation of what an honest distributed database device would allow, then a copy of the original distributed database cannot have unique changes associated to the copy of the original distributed database and still create state proofs that match the ledger identifier of the original database. Thus, the ledger identifier acts as a unique name and/or identifier for the original distributed database that does not change as the contents of the original distributed database changes. The ledger identifier uniquely identifies only one such original distributed database. A third party and/or user device can verify a piece of information and/or data if they are given a state proof for the piece of information and/or data, even if the state proof is constructed by an untrusted distributed database device or a malicious distributed database device.

In some implementations, a distributed database device can disconnect and then reconnect as part of the distributed database. In such implementations, the distributed database device (e.g., processor of the distributed database device) can use a state proof as part of a reconnection event to update its distributed database instance and/or to verify data in its distributed database instance. In some implementations, the state proof used by a distributed database device does not include a Merkle path for the leaf node having the data, but otherwise can be the same as the state proof used by a user device to verify data. Specifically, when a distributed database device reconnects to the network after being disconnected for a time period, the distributed database device can receive a state proof from another distributed database device. The reconnecting distributed database device (e.g., a processor of the reconnecting distributed database device) can:

Verify that the ledger identifier in the state proof matches a known ledger identifier for the distributed database (e.g., stored in a memory of the reconnecting distributed database device);

Verify that the ledger identifier corresponds to the hash of the initial and/or genesis address book from the address book history of the state proof;

Verify that each address book in the address book history of the state proof (other than the initial and/or genesis address book) is signed by a threshold number (based on total number or an amount of stake) of distributed database devices in the immediately preceding address book in the address book history of the state proof; and/or Verify that the Merkle tree root, the state proof, the data in the state proof, and/or the timestamp of the state proof is/are signed by a threshold number (based on total number or an amount of stake) of distributed database devices from the current address book of the distributed database.

The reconnecting distributed database device, however, may not verify a Merkle path. Thus, a state proof used by a distributed database device may not include a Merkle path for a leaf node having data. Verifying the root node of the Merkle tree can be done to ensure that the state of the reconnecting distributed database device is correct and matches that of the Merkle tree in the state proof. Once verified, the reconnecting distributed database device verifies that the reconnecting distributed database device is storing the correct state of the distributed database.

Figure 7:
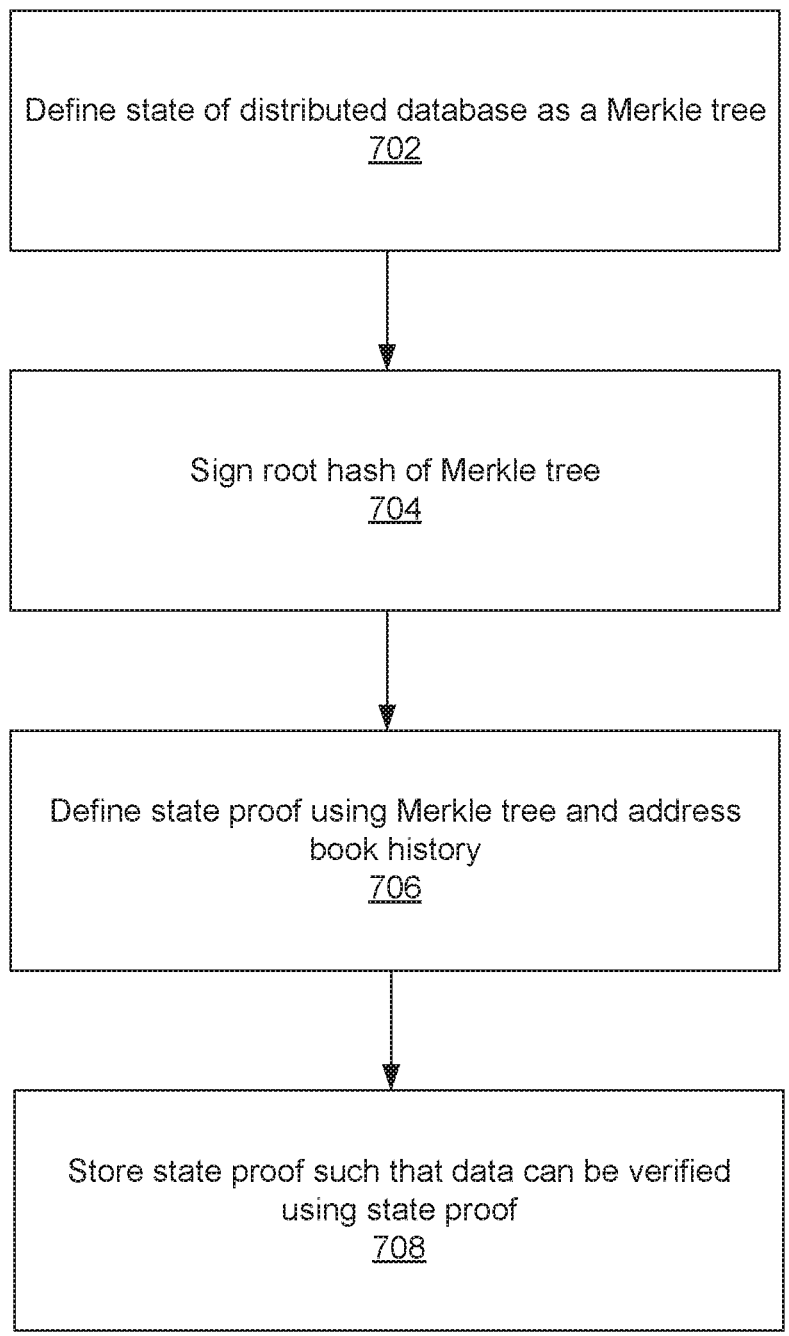
FIG. 7 is a flow chart of a method for defining a state proof, according to an embodiment.

FIG. 7 is a flow chart illustrating a method 700 of defining a state proof as described above. Such a method can be code stored in a memory (e.g., memory 220 of FIG. 2) and executed by a processor (e.g., processor 210 of FIG. 2) of a compute device (e.g., compute device 200) associated with and/or implementing a distributed database. The method 700 includes, at 702, defining a state of a distributed database as a Merkle tree. The state can be based on transactions and/or events exchanged between compute devices and/or distributed database devices implementing the distributed database and executed in a consensus order. Moreover, the state can be the result of a consensus algorithm and/or protocol implemented by the distributed database.

At 704, the root hash of the Merkle tree can be signed. Specifically, a compute device can digitally sign the hash of the root node of the Merkle tree with a private key of that compute device. In some implementations, each distributed database device implementing the distributed database can send its signature to the other distributed database devices implementing the distributed database. In some implementations, if a distributed database device receives signatures from a supermajority of the other distributed database devices (and/or a number of distributed database devices greater than a threshold), then that set of signatures is considered sufficient to prove that the Merkle tree root hash is valid at the time of the given timestamp. In implementations that use stake instead of a total number of distributed database devices, if a distributed database device receives signatures from distributed database devices that collectively have a supermajority of the total stake of the distributed database (and/or an amount of stake greater than a threshold), then that set of signatures is considered sufficient to prove that the Merkle tree root hash is valid at the time of the given timestamp. The signatures can be verified using the public key(s) of the signing compute devices.

At 706, a state proof can be defined using the Merkle tree and an address book history. In some implementations, the state proof can be defined to include additional information, as described above. At 708, the state proof can be stored such that data can be verified using the state proof. More specifically, a third-party can use the state proof to verify information included in the distributed database and/or the state of the distributed database.

FIG. 8 is a flow chart of a method 800 for verifying data within a distributed database, according to an embodiment. Such a method 800 can be executed using code stored in a memory (e.g., memory 220 of FIG. 2) and executed by a processor (e.g., processor 210 of FIG. 2) of a compute device (e.g., compute device 200) associated with and/or implementing a distributed database. The method 800 includes, at 802, calculating, at a first time and using a first address book of a distributed database implemented by a first set of compute devices, an identifier for the distributed database. As discussed above, in some implementations, this can be a ledger identifier for the distributed database. Such a ledger identifier can be a hash of the initial and/or genesis address book for the distributed database. Moreover, in some implementations, such an identifier can be used as a unique identifier for the distributed database.

At 804, a transaction is received to at least one of (1) add a compute device to the first set of compute devices, (2) remove a compute device from the first set of compute devices, or (3) modify a compute device from the first set of compute devices, to define a second set of compute devices. Such a transaction can be provided as part of an event of the distributed database. The event can be provided to the other compute devices and/or members of the distributed database such that a consensus order can be defined for the event and/or the transaction. The second set of compute devices can be the set of compute devices and/or members of the distributed database after the transaction is executed in its consensus order.

At 806, a second address book including a public key associated with each compute device from the second set of compute devices is defined at a second time after the first time. In some implementations, this second address book is defined based on the transaction updating the compute devices and/or members of the distributed database.

At 808, a state proof associated with data of the distributed database is received from a compute device from the second set of compute devices after the second time. As discussed above, such a state proof can be defined such that a compute device can use the state proof to verify the data as part of the state of the distributed database.

At 810, the data of the distributed database is verified by confirming that a predetermined number of compute devices from the first set of compute devices have digitally signed the second address book. The predetermined number of compute device can be a supermajority of compute devices from the set first set of compute devices. Moreover, in some implementations, additional information, as described above with respect to state proofs, can be used to verify the data of the distributed database.

In some instances, a user and/or user device (e.g., processor of a user device) can verify the data of the distributed database using a verification method. The verification method can include, verifying that a ledger identifier matches a known ledger identifier. The verification method can further include, verifying that the ledger identifier equals the hash of a genesis address book. The verification method can further include, verifying that each address book in an address book history of the state proof, other than the genesis address book, is signed by a predetermined number (e.g., based on total number or total stake) of compute devices from a set of compute devices in an immediately preceding address book. The verification method can further include, verifying that a root node of a Merkle tree used to store the data is signed by a supermajority and/or predetermined number of compute devices from the second set of compute devices. The verification method can further include, verifying that the Merkle path is valid for a sequence of nodes from the root node of the Merkle tree to a leaf node of the Merkle tree storing the data to be verified.

While described above as using a hashgraph and storing and exchanging transactions within events, in other instances any other suitable distributed database and/or distributed ledger technology can be used to implement the above-described methods to facilitate state proofs. For example, in other instances technologies such as blockchain, PAXOS, RAFT, Bitcoin, Ethereum and/or the like can be used to implement such methods.

While described above as an event containing a hash of two prior events (one self-hash and one foreign hash), in other embodiments, a member can sync with two other members to create and/or define an event containing hashes of three prior events (one self-hash and two foreign hashes). In still other embodiments, any number of event hashes of prior events from any number of members can be included within an event. In some embodiments, different events can include different numbers of hashes of prior events. For example, a first event can include two event hashes and a second event can include three event hashes.

While events are described above as including hashes (or cryptographic hash values) of prior events, in other embodiments, an event can be created and/or defined to include a pointer, an identifier, and/or any other suitable reference to the prior events. For example, an event can be created and/or defined to include a serial number associated with and used to identify a prior event, thus linking the events. In some embodiments, such a serial number can include, for example, an identifier (e.g., media access control (MAC) address, Internet Protocol (IP) address, an assigned address, and/or the like) associated with the member that created and/or defined the event and an order of the event defined by that member. For example, a member that has an identifier of 10 and the event is the 15th event created and/or defined by that member can assign an identifier of 1015 to that event. In other embodiments, any other suitable format can be used to assign identifiers for events.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
   a memory of a compute device associated with a distributed database implemented by a plurality of compute devices via a network operatively coupled to the plurality of compute devices; and
   a processor operatively coupled to the memory, and configured to:
      receive, from a compute device from the plurality of compute devices, a state proof associated with a state of the distributed database, the state being associated with a Merkle tree, the state proof including:
         data associated with the state, the data being stored as a leaf record of the Merkle tree,
         a timestamp associated with the state,
         a first identifier of the distributed database, and
         a set of address books associated with the distributed database, each address book from the set of address books associated with a version of the distributed database during a time period different from a time period associated with the version of the distributed database associated with each remaining address book from the set of address books, the set of address books having a chronological order; and
      determine validity of the data at a time associated with the timestamp by:
         verifying that a Merkle path is valid for a sequence from a Merkle tree root to the leaf record;
         verifying that the first identifier of the distributed database is correct based on a second identifier of the distributed database stored in the memory,
         verifying that the data associated with the state has been digitally signed by a predetermined number of compute devices from the plurality of compute devices, and
         other than an initial address book from the set of address books, verifying that each address book from the set of address books is digitally signed by a predetermined number of compute devices from a set of compute devices associated with an immediately preceding address book in the chronological order and from the set of address books.

2. The apparatus of claim 1, wherein the processor is configured to receive the state proof as part of the compute device associated with the distributed database reconnecting with the distributed database.

3. The apparatus of claim 1, wherein the processor is configured to discard the data in response to determining that the data is invalid.

4. The apparatus of claim 1, wherein the processor is configured to process the data as valid in response to determining that the data is valid.

5. The apparatus of claim 1, wherein the second identifier of the distributed database is a hash value calculated using the initial address book.

6. The apparatus of claim 1, wherein the data associated with the state is a portion of data stored in the distributed database.

7. The apparatus of claim 1, wherein a digital signature associated with the data is an aggregate signature associated with each compute device from the plurality of compute devices that has digitally signed the data.

8. The apparatus of claim 1, wherein the compute device from the plurality of compute devices is a first compute device from the plurality of compute devices,
a second compute device from the plurality of compute devices digitally signs the data using a private key associated with the second compute device, the processor configured to verify the second compute device has digitally signed the data using a public key associated with the second compute device.

9. The apparatus of claim 1, wherein:
each address book from the set of address books is a set of public keys, each public key from the set of public keys being associated with an amount of stake,
for each address book from the set of address books, each public key from the set of public keys associated with that address book is associated with a compute device from a plurality of compute devices that implements the version of the distributed database during the time period associated with that address book.

10. The apparatus of claim 1, wherein the processor is configured to define a new address book in response to receiving an event including at least one of:
a transaction to add a compute device to the plurality of compute devices,
a transaction to remove a compute device from the plurality of compute devices, or
a transaction to update an amount of stake associated with a compute device from the plurality of compute devices.

11. The apparatus of claim 1, wherein the predetermined number of compute devices from the plurality of compute devices is based on a total number of compute devices within the plurality of compute devices.

12. The apparatus of claim 1, wherein the predetermined number of compute devices from the plurality of compute devices is based on a stake associated with each compute device from the plurality of compute devices.

13. The apparatus of claim 1, wherein the verifying that the data associated with the state has been digitally signed includes verifying that a hash value of the data associated with the state has been digitally signed by the predetermined number of compute devices from the plurality of compute devices.

14. The apparatus of claim 1, wherein the compute device from the plurality of compute devices is a first compute device from the plurality of compute devices,
the compute device associated with the distributed database is a second compute device from the plurality of compute devices implementing the distributed database.

15. The apparatus of claim 1, wherein the compute device associated with the distributed database is (1) associated with a user of the distributed database, (2) not from the plurality of compute devices implementing the distributed database, and (3) operatively coupled to the compute device from the plurality of compute devices implementing the distributed database.

16. A non-transitory processor-readable medium storing code representing instructions to be executed by a processor, the code comprising code to cause the processor to:
receive, from a compute device from a plurality of compute devices that implements a distributed database via a network, a state proof associated with a state of the distributed database, the state proof including:
a timestamp associated with the state,
a first identifier of the distributed database,
data stored as a set of leaf records of a Merkle tree of the state,
a Merkle path associated with the data, and
a set of address books associated with the distributed database, each address book from the set of address books associated with a version of the distributed database during a time period different from a time period associated with the version of the distributed database associated with each remaining address book from the set of address books, the set of address books having a chronological order; and
determine validity of the data at a time associated with the timestamp by:
verifying the Merkle path as valid for a sequence from a root of the Merkle tree to a leaf record from the set of leaf records,
verifying that the first identifier of the distributed database is correct based on a second identifier of the distributed database stored in a memory,
verifying that the data associated with the state has been digitally signed by a predetermined number of compute devices from the plurality of compute devices, and
other than an initial address book from the set of address books, verifying that each address book from the set of address books is digitally signed by a predetermined number of compute devices from a set of compute devices associated with an immediately preceding address book in the chronological order and from the set of address books.

17. The non-transitory processor-readable medium of claim 16, wherein the code to cause the processor to receive includes code to cause the processor to receive the state proof in response to a request to verify the data.

18. The non-transitory processor-readable medium of claim 16, further comprising code to cause the processor to:
disregard the data in response to determining that the data is invalid.

19. The non-transitory processor-readable medium of claim 16, wherein the verifying that the data associated with the state has been digitally signed includes verifying that the predetermined number of compute devices from the plurality of compute devices have digitally signed the root of the Merkle tree.

20. The non-transitory processor-readable medium of claim 16, wherein the verifying the Merkle path includes using a set of hash values associated with a set of sibling nodes of each node on a sequence from the leaf record to the root of the Merkle tree.

21. The non-transitory processor-readable medium of claim 16, wherein the verifying that the data associated with the state has been digitally signed includes verifying that a hash value of the data has been digitally signed by the predetermined number of compute devices from the plurality of compute devices.

22. The non-transitory processor-readable medium of claim 16, wherein the predetermined number of compute devices from the set of compute devices is based on a stake associated with each compute device from the set of compute devices.

23. A method, comprising:
   receiving, from a compute device from a plurality of compute devices that implements a distributed database via a network, a state proof associated with a state of the distributed database, the state proof including:
   a timestamp associated with the state,
   a first identifier of the distributed database,
   data stored as a set of leaf records of a Merkle tree of the state,
   a Merkle path associated with the data, and
   a set of address books associated with the distributed database, each address book from the set of address books associated with a version of the distributed database during a time period different from a time period associated with the version of the distributed database associated with each remaining address book from the set of address books, the set of address books having a chronological order; and
   determining validity of the data at a time associated with the timestamp by:
   verifying the Merkle path as valid for a sequence from a root of the Merkle tree to a leaf record from the set of leaf records,
   verifying that the first identifier of the distributed database is correct based on a second identifier of the distributed database stored in a memory,
   verifying that the data associated with the state has been digitally signed by a predetermined number of compute devices from the plurality of compute devices, and
   other than an initial address book from the set of address books, verifying that each address book from the set of address books is digitally signed by a predetermined number of compute devices from a set of compute devices associated with an immediately preceding address book in the chronological order and from the set of address books.

24. The method of claim 23, wherein the receiving includes receiving the state proof in response to a request to verify the data.

25. The method of claim 23, further comprising:
   disregarding the data in response to determining that the data is invalid.

26. The method of claim 23, wherein the verifying that the data associated with the state has been digitally signed includes verifying that the predetermined number of compute devices from the plurality of compute devices have digitally signed the root of the Merkle tree.

27. The method of claim 23, wherein the verifying the Merkle path includes using a set of hash values associated with a set of sibling nodes of each node on a sequence from the leaf record to the root of the Merkle tree.

28. The method of claim 23, wherein the verifying that the data associated with the state has been digitally signed includes verifying that a hash value of the data has been digitally signed by the predetermined number of compute devices from the plurality of compute devices.

29. The method of claim 23, wherein the predetermined number of compute devices from the set of compute devices is based on a stake associated with each compute device from the set of compute devices.

\* \* \* \* \*